(12) United States Patent
Wan et al.

(10) Patent No.: US 11,127,040 B2
(45) Date of Patent: *Sep. 21, 2021

(54) METHOD AND APPARATUS FOR REAL-TIME DELIVERY OF PUBLICLY DISPLAYED INFORMATION TO MOBILE DEVICES

(71) Applicant: xAd, Inc., New York, NY (US)

(72) Inventors: Feng Wan, Mountain View, CA (US); Srihari Venkatesan, Mountain View, CA (US); Saravana Ravindran, Mountain View, CA (US); Shanshan Tuo, Mountain View, CA (US); Prakash Muttineni, San Ramon, CA (US); Deborah Zhang, Mountain View, CA (US); Huitao Luo, Fremont, CA (US); Shashi Seth, Mountain View, CA (US)

(73) Assignee: xAd, Inc., New York, NY (US)

( * ) Notice: Subject to any disclaimer, the term of this patent is extended or adjusted under 35 U.S.C. 154(b) by 570 days.

This patent is subject to a terminal disclaimer.

(21) Appl. No.: 15/860,626

(22) Filed: Jan. 2, 2018

(65) Prior Publication Data

US 2018/0197204 A1 Jul. 12, 2018

Related U.S. Application Data

(60) Provisional application No. 62/441,433, filed on Jan. 1, 2017, provisional application No. 62/441,435, filed
(Continued)

(51) Int. Cl.
*G06Q 30/02* (2012.01)
*H04W 4/02* (2018.01)
(Continued)

(52) U.S. Cl.
CPC ..... *G06Q 30/0261* (2013.01); *G06F 3/04842* (2013.01); *G06F 16/29* (2019.01);
(Continued)

(58) Field of Classification Search
CPC .............. G06Q 30/02; G06Q 30/0261; G06Q 30/0266; G06Q 30/0205; G06Q 30/0267;
(Continued)

(56) References Cited

U.S. PATENT DOCUMENTS 8,688,517 B2 * 4/2014 Lutnick .............. G06Q 30/0209
705/14.4
10,133,530 B2 * 11/2018 Wasserman .......... G08G 1/0141
(Continued)

FOREIGN PATENT DOCUMENTS

JP  2004030570 A  *  2/2003

OTHER PUBLICATIONS

XAD, Inc., International Search Report and Written Opinion, PCT/US2018/12119, dated Apr. 5, 2018, 8 pgs.
(Continued)

*Primary Examiner* — Thuy N Nguyen
(74) *Attorney, Agent, or Firm* — USCH Law, PC

(57) ABSTRACT

Location data of a large number of mobile devices and map data are used to derive a large number of commute routes in a geographical area, which are used to build a relational database including associations between a plurality of road segments and a plurality of information documents. Each of the plurality of information documents corresponds to a billboard in the geographical area and includes information displayed by the billboard. A respective road segment in the relational database has one or more associations with one or more information documents, each of the one or more information documents being associated with the respective road segment by a corresponding probability value indicat-
(Continued)

ing a degree of likelihood of a traveler on the respective road segment being exposed to information displayed on a billboard corresponding to the each of the one or more information documents. The relational database is used to select publicly displayed information for delivery to mobile devices detected to be on public roads.

17 Claims, 24 Drawing Sheets

Related U.S. Application Data on Jan. 1, 2017, provisional application No. 62/441,436, filed on Jan. 1, 2017.

(51) Int. Cl.
  G06F 16/29 (2019.01)
  G06F 3/0484 (2013.01)
(52) U.S. Cl.
  CPC ..... *G06Q 30/0205* (2013.01); *G06Q 30/0266* (2013.01); *G06Q 30/0267* (2013.01); *H04W 4/02* (2013.01)
(58) Field of Classification Search
  CPC ..... G01C 21/00; G06F 16/9537; G06F 16/29; G06F 3/04842; H04W 4/02
  See application file for complete search history.

(56) References Cited

U.S. PATENT DOCUMENTS

| 10,769,667 | B2 * | 9/2020 | Zavesky | ............ G06Q 30/0269 |
| 2002/0174009 | A1 | 11/2002 | Myers et al. | |
| 2003/0149601 | A1 | 8/2003 | Cabral | |
| 2008/0089288 | A1 * | 4/2008 | Anschutz | ............... G06Q 30/02 370/331 |
| 2009/0259436 | A1 * | 10/2009 | Doe | ....................... G06Q 30/02 702/181 |
| 2011/0035662 | A1 | 2/2011 | King et al. | |
| 2012/0054028 | A1 * | 3/2012 | Tengler | .................. G06Q 30/02 705/14.49 |
| 2012/0250540 | A1 * | 10/2012 | Smartt | .................. H04L 12/189 370/252 |
| 2012/0303455 | A1 | 11/2012 | Busch | |
| 2013/0096966 | A1 | 4/2013 | Barnes, Jr. | |
| 2014/0062687 | A1 * | 3/2014 | Voticky | ............. G06Q 30/0251 340/438 |
| 2015/0150035 | A1 * | 5/2015 | Chizi | ................... H04N 21/812 725/14 |
| 2015/0160016 | A1 * | 6/2015 | Kim | ..................... G09B 29/106 701/455 |
| 2015/0332325 | A1 | 11/2015 | Sharma et al. | |
| 2015/0348110 | A1 * | 12/2015 | Megdal | ................. H04W 4/029 705/14.58 |
| 2015/0356618 | A1 | 12/2015 | Vaysman | |
| 2017/0213240 | A1 * | 7/2017 | Waldron | ............ G06Q 30/0246 |
| 2017/0345051 | A1 * | 11/2017 | Moseman | .......... G06Q 30/0246 |
| 2017/0371608 | A1 * | 12/2017 | Wasserman | ............... G06F 3/14 |

OTHER PUBLICATIONS

XAD, Inc., International Preliminary Report on Patentability, PCT/US2018/012119, dated Jul. 2, 2019, 6 pgs.

* cited by examiner

| Road Segment ID | City/State | Road Name | Spatial Index for Road Segment | Number of Through Routes | BB ID | BB ID | BB ID |
|---|---|---|---|---|---|---|---|
| f3***976 | Sunnyvale/CA | CA82, W | a1, a2, ..., ai | 124751 | P9875436 | P7654890 | |
| e2***675 | Sunnyvale/CA | CA82, W | b1, b2, ..., bj | 235678 | | | |
| b6***673 | Sunnyvale/CA | CA82, W | c1, c2, ..., ck | 235147 | P7685932 | | |
| c2***786 | Sunnyvale/CA | CA82, W | d1, d2, ..., dl | 823574 | P7654389 | P5678543 | |
| a5***321 | Sunnyvale/CA | G2, S | e1, e2, ..., em | 159876 | | | |
| g7***867 | Sunnyvale/CA | G2, S | f1, f2, ..., fn | 169874 | B3457321 | B6754327 | |
| b9***538 | Sunnyvale/CA | G2, S | g1, g2, ..., gm | 210456 | B6784679 | | |
| ...... | ...... | | | | ...... | ...... | ...... |

FIG. 5

| Road Segment ID | City/State | Road ID & Direction of Travel | Spatial Index | Doc ID | P/V | Doc ID | P/V | ...... | Doc ID | P/V |
|---|---|---|---|---|---|---|---|---|---|---|
| a2***369 | Menlo Park/CA | CA82, N | a1, a2, ..., ai | P09874 | 100% | S89765 | 87% | ...... | | |
| b6***845 | Menlo Park/CA | CA82, N | b1, b2, ..., bj | P87634 | 95% | B76548 | 76% | ...... | | |
| c6***963 | Menlo Park/CA | CA82, N | c1, c2, ..., ck | B76489 | 87% | P09756 | 73% | ...... | | |
| d5***895 | Menlo Park/CA | US101, N | d1, d2, ..., dl | B87456 | 100% | S09860 | 96% | ...... | | |
| e6***412 | Menlo Park/CA | US101, N | e1, e2, ..., em | B89765 | 100% | B67459 | 87% | ...... | | |
| f8***697 | Menlo Park/CA | US101, N | f1, f2, ..., fn | B76894 | 84% | B76543 | 62% | ...... | | |
| g5***326 | Menlo Park/CA | US101, N | g1, g2, ..., gm | P90867 | 100% | P67823 | 91% | ...... | | |
| ...... | ...... | | ...... | ...... | | ...... | | ...... | | |

METHOD AND APPARATUS FOR REAL-TIME DELIVERY OF PUBLICLY DISPLAYED INFORMATION TO MOBILE DEVICES

CROSS REFERENCE TO RELATED APPLICATIONS

The present application claims priority to U.S. Provisional Application No. 62/441,433, filed Jan. 1, 2017, entitled "Method and Apparatus for Delivering Publicly Displayed Information to Mobile Devices based on Mobile User Travel Routes," U.S. Provisional Application No. 62/441,435, filed Jan. 1, 2017, entitled "Method and Apparatus for Delivering Publicly Displayed Information to Mobile Devices based on User Travel Routes and Travel Speeds," and U.S. Provisional Application No. 62/441,436, filed Jan. 1, 2017, entitled "Method and Apparatus for Real-Time Delivery of Publicly Displayed Information to Mobile Devices." Each of the above applications is incorporated herein by reference in its entirety. The present application is related to commonly-owed U.S. Patent Application entitled "Method and Apparatus for Delivering Publicly Displayed Information to Mobile Devices based on Location History," filed on even date herewith, and commonly-owed PCT Application entitled "Method and Apparatus for Delivering Publicly Displayed Information to Mobile Devices," filed on even date herewith, each of which is incorporated herein by reference in its entirety.

DESCRIPTION OF RELATED ART

The present application is related to mobile advertising and more particularly to method and system for real-time delivery of publicly displayed information to mobile devices.

BACKGROUND

Mobile advertising originates from, and is integral to, the development and widespread use of computer technology. Many smartphone software and application developers depend on advertising revenue to fund their efforts. To take advantage of the mobile nature of mobile phones, sophisticated technologies have been developed to estimate mobile device locations based on the signals they send and the relevancy of the locations to nearby points of interest (POIs), in order to deliver precise, relevant, and timely information to the mobile devices. Thus, mobile advertising technology is computer technology and has only been performed using computers with proprietary software.

An important part of mobile advertising is geo-fencing, which involves creating a virtual "fence" around a point or place of interests (POI), and delivering specific information to mobile devices determined to be in the fence. Information delivered through geo-fencing typically yield higher hit rate and better return on investment because it is more contextual. Thus, how to define the geo-fences to increase the relevancy of the delivered information has been the subject of intense research and development effort.

Organizations have been displaying information to the public using large signs such as posters, billboards, etc., for a long time. Billboards are panels or structures displaying information or messages, and come in different forms and sizes. Larger sized billboards, such as those shown in FIGS. 1A and 1B are usually placed along roads and streets, and on structures such as poles and sides of buildings, to allow people traveling by to catch glimpses of them. Smaller billboards, signs, posts or displays, such as the ones shown in FIG. 1C, are usually placed on structures such as walls and bus stands so passersby can see them. Typically showing witty slogans and distinctive visuals, these signs are designed to catch a person's attention and create an impression very quickly. Yet, the impression is usually fleeting unless it is repeated. Often, people pass by these billboards, signs or posts and become interested in their displayed messages but do not retain enough information to follow up on their interests.

DESCRIPTION OF THE DRAWINGS

FIG. 5 is a table illustrating examples of the content in a segments database according to certain embodiments.

FIG. 9A is a table illustrating examples of the content in the relational database according to certain embodiments.

DESCRIPTION OF THE EMBODIMENTS

Figure 1A:
FIGS. 1A-1C are pictures showing examples of billboards or posters disposed by public roads or pedestrian walkways.
Figure 1B:
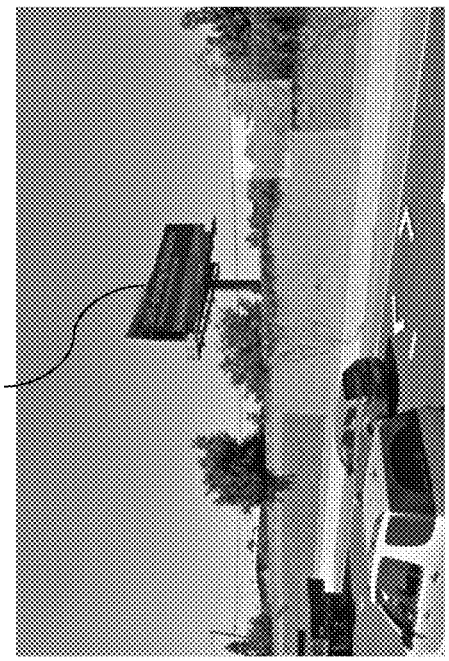
Figure 1C:

Embodiments of the present application improve upon traditional mobile advertising technology by providing techniques to detect mobile devices on certain pubic roads and to enable delivery of information displayed along the public roads on posters or billboards or other large signs, or information about points of interests along the public roads, to these mobile devices to create additional impressions and provide the users of the mobile devices easy access to the displayed information, or to provide directions and information about the points of interests along estimated mobile users' routes.

According to certain embodiments, location data associated with a large number (e.g., millions) of mobile devices communicating with a packet-based network are acquired by receiving and processing advertisement (ad) requests from mobile publishers or mobile application providers, and/or by receiving location updates from mobile devices with certain background apps installed and running. The acquired location data are stored in a location database. Commute routes regularly taken by the user of a particular mobile device can then be derived using location data associated with the particular mobile device with respect to map data. As a result, a large number (e.g., millions) of commute routes in a geographical area can be generated using the location data associated with a large number (e.g., millions) of such mobile devices. Each of the commute routes includes a sequence of road segments, which are segments of public roads that are separated from each other by entry/exit (E/E) points, which are ways of entering or exiting the public roads. In certain embodiments, a road segment is for one direction of travel. Thus, a section of a public road between two adjacent E/E points can include two road segments, one for each of two opposite directions of travel.

In certain embodiments, data associated with each road segment is stored in a road segments database, which can include, for example, some or all of a name of the public road the road segment is a part of, geographical definition of the road segment, direction of travel on the road segment (e.g, north, south, southwest, etc.), a geographical region (e.g., city, county, and/or state) where the road segment is situated, a number of commute routes that include the road segment, and one or more billboards displaying information discernable by travelers on the road segment.

In certain embodiments, a probability value with which a traveler on a first road segment has come from or is proceeding to a second road segment is determined based at least on a number of commute routes including the first road segment, and a percentage of the number of commute routes that come from or proceed to the second road segment. Such probability values are used to build a relational database, which include associations between a plurality of road segments and a plurality of information documents. Each of the plurality of information documents corresponds to a billboard in the geographical area and includes information displayed by the billboard. A respective road segment in the relational database has one or more associations with one or more information documents, each of the one or more information documents being associated with the respective road segment by a corresponding probability value indicating a degree of likelihood of a traveler on the respective road segment being exposed to information displayed on a billboard corresponding to the each of the one or more information documents. This probability value is above a preset threshold (e.g., 70%).

In certain embodiments, when a new ad request including location data associated with a particular mobile device communicating with the packet-based network is received, and the location data indicates that the particular mobile device is on a particular road segment in the relational database, an information document for delivery to the particular mobile device is selected from the one or more information documents associated with the particular segment in the relational database based on at least on the corresponding probability values.

In certain embodiments, the commute routes for a respective mobile device are determined by determining at least a first place and a second place using the location data associated with the respective mobile device. Each of the first place and the second place can be a place where the user of the respective mobile device regularly visits or stays as indicated by the location data associated with the respective mobile device. Commute routes between the first place and the second place can then be determined using the map data.

Figure 1D:
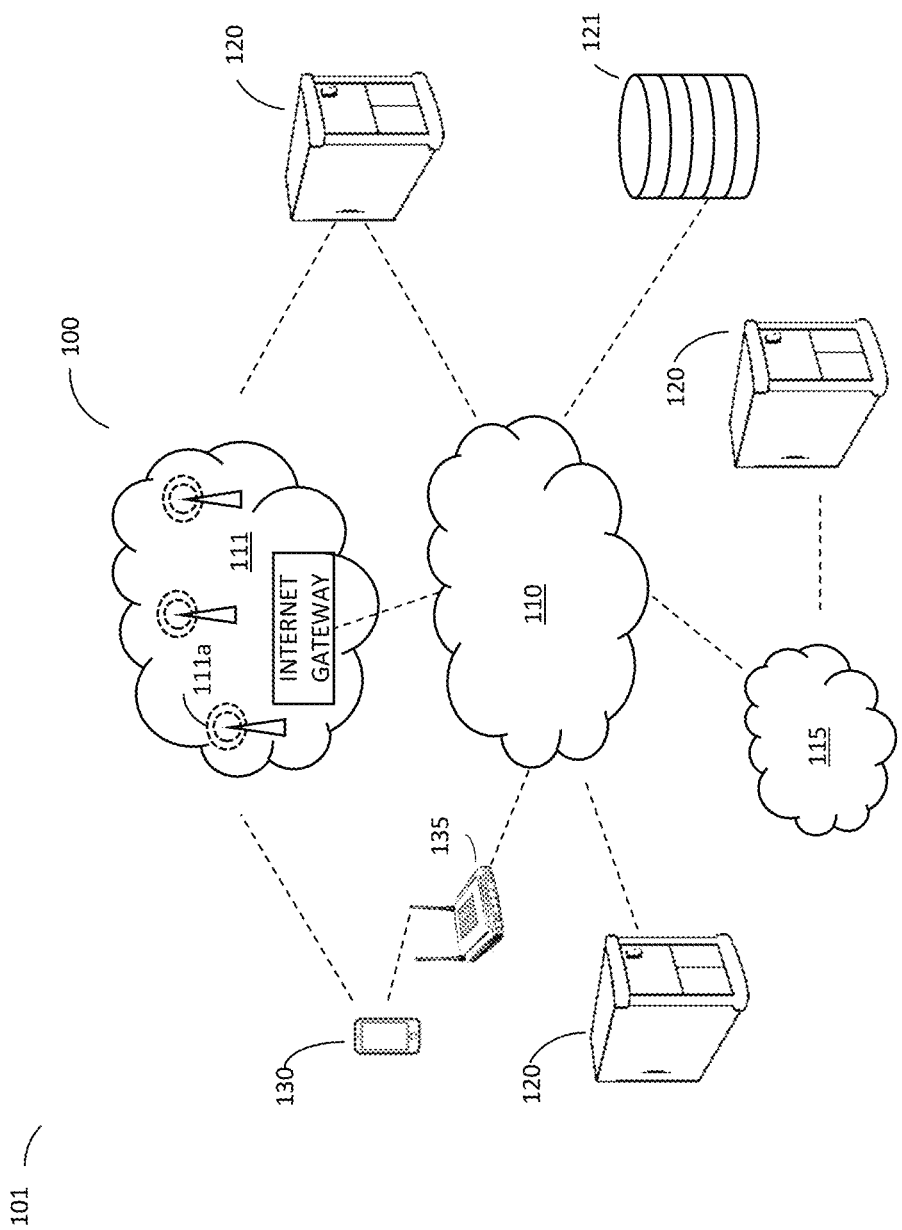
FIG. 1D is a schematic diagram illustrating an overview of an environment in which some embodiments of the disclosed technology may operate.

FIG. 1D is a schematic diagram illustrating an overview of an environment 101 in which some embodiments of the disclosed technology may operate. Environment 101 can include one or more computer systems 120 coupled to a packet-based network 100. The packet-based network 100 in certain embodiments includes the Internet 110 and part or all of a cellular network 111 coupled to the Internet 110 via an Internet Gateway. The computers/servers 120 can be coupled to the Internet 110 using wired Ethernet and optionally Power over Ethernet (PoE), WiFi, and/or cellular connections via the cellular network 111 including a plurality of cellular towers 111a. The network may also include one or more network attached storage (NAS) systems 121, which are computer data storage servers connected to a computer network to provide data access to a heterogeneous group of clients. As shown in FIG. 1D, one or more mobile devices 130 such as smart phones or tablet computers are also coupled to the packet-based network via cellular connections to the cellular network 111. When a WiFi hotspot (such as hotspot 135) is available, a mobile device 130 may connect to the Internet 110 via a WiFi hotspot 135 using its built-in WiFi connection. Thus, the mobile devices 130 may interact with other computers/servers coupled to the Internet 110.

The computers/servers 120 can include server computers, client computers, personal computers (PC), tablet PC, set-top boxes (STB), personal digital assistant devices (PDA), web appliances, network routers, switches or bridges, or any computing devices capable of executing instructions that specify actions to be taken by the computing devices. As shown in FIG. 1D, some of the computers/servers 120 are coupled to each other via a local area network (LAN) 115, which in turn is coupled to the Internet 110. Also, each computer/server 120 referred herein can include any collection of computing devices that individually or jointly execute instructions to serve as a script file server, as described in further detail below.

Figure 2A:
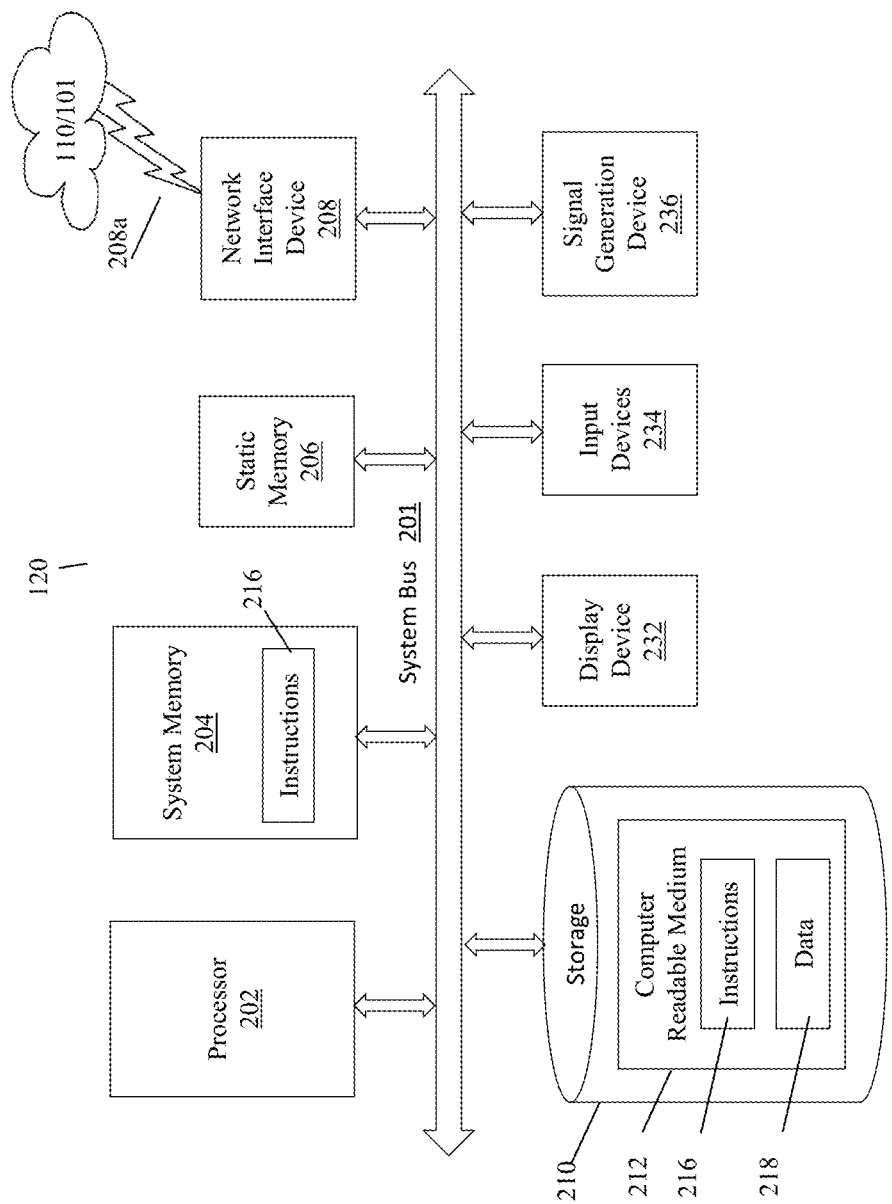
FIG. 2A is a diagrammatic representation of a computer/server coupled to a network that can be used to implement the disclosed technology according to certain embodiments.

FIG. 2A is a diagrammatic representation of one of the computer systems 120 in the environment 101, which can be used to implement the technologies according to certain embodiments. The computer/server 120 may operate as a standalone device or as a peer computing device in a peer-to-peer (or distributed) network computing environment. As shown in FIG. 2, the computer/server 120 includes one or more processors 202 (e.g., a central processing unit (CPU), a graphic processing unit (GPU), and/or a digital signal processor (DSP)) and a system or main memory 204 coupled to each other via a system bus 201. The computer/server 120 may further include static memory 206, a network interface device 208, a storage unit 210, one or more display devices 230, one or more input devices 234, and a signal generation device (e.g., a speaker) 236, with which the processor(s) 202 can communicate via the system bus 201.

In certain embodiments, the display device(s) 230 include one or more graphics display units (e.g., a plasma display panel (PDP), a liquid crystal display (LCD), a projector, or a cathode ray tube (CRT)). The input device(s) 234 may include an alphanumeric input device (e.g., a keyboard), a cursor control device (e.g., a mouse, trackball, joystick, motion sensor, or other pointing instrument). The storage unit 210 includes one or more machine-readable media 212 which store computer program instructions 216 (e.g., software), such as computer program instructions that enable anyone or more of the systems, methodologies or functions described herein. The storage unit 210 may also store data 218, such as the data used and/or generated by the systems, methodologies or functions in the disclosed embodiments. The instructions 216 (e.g., software) may be loaded, completely or partially, within the main memory 204 or within the processor 202 (e.g., within a processor's cache memory) during execution thereof by the computer/server 120. Thus, the main memory 204 and the processor 202 also constitute machine-readable media.

While machine-readable medium 212 is shown in an exemplary embodiment to be a single medium, the term "machine-readable medium" should be taken to include a single medium or multiple media (e.g., a centralized or distributed database, or associated caches and servers) able to store instructions and data. The term "machine-readable medium" shall also be taken to include any medium that is capable of storing instructions (e.g., instructions 216) for execution by the computer/server 120 and that cause the computing device to perform anyone or more of the methodologies disclosed herein. The term "machine-readable medium" includes, but not be limited to, data repositories in the form of solid-state memories, optical media, and magnetic media. In certain embodiments, the instructions 216 and/or data 218 can be stored in the network 100 and accessed by the computer/server 120 via its network interface device 208, which provides wired and/or wireless connections to a network, such as a local area network 115 and/or a wide area network (e.g., the Internet 110) via some type of network connectors 280a. The instructions 216 (e.g., software) and or data 218 may be transmitted or received via the network interface device 208.

Mobile device 130 represents millions and millions of mobile devices communicating with the network 100. The computers/servers 120 coupled to the Internet may include one or more publishers that interact with the mobile devices running apps provided by the publishers. The publishers, as they interact with the mobile devices, generate mobile supplies, in the form of information requests transmitted in data packets. Each information request carries request data including characteristics of an associated mobile device, certain information about its user, and raw location data indicating the location thereof. The publishers may post the mobile supplies on webpages for bidding by, for example, advertisers or their agents, or transmit the mobile supplies to an ad agent or ad middleman for fulfillment, or fulfill the supplies themselves. Some mobile devices may also have certain types of background applications (apps) installed and running to provide mobile supplies in the form of, for example, automatic location updates, periodically to those contracted to receive the updates.

As more and more mobile supplies (e.g., ad requests, location updates, etc.) are generated and collected by various parties coupled to the network 100, the data in the mobile supply can be processed to produce statistical results about the mobile users and to predict mobile user behaviors, which, when combined with real-time data, can be used by the information providers to serve more relevant information to the mobile users. In certain embodiments, road traffic statistics are derived in an offline process from location data associated with a large number (e.g., millions) of mobile devices. The road traffic statistics include percentages of traffic on certain road segments proceeding to or coming from other road segments, which are used to predict mobile users' exposure to information displayed by public roads, as discussed further below.

Figure 2B:
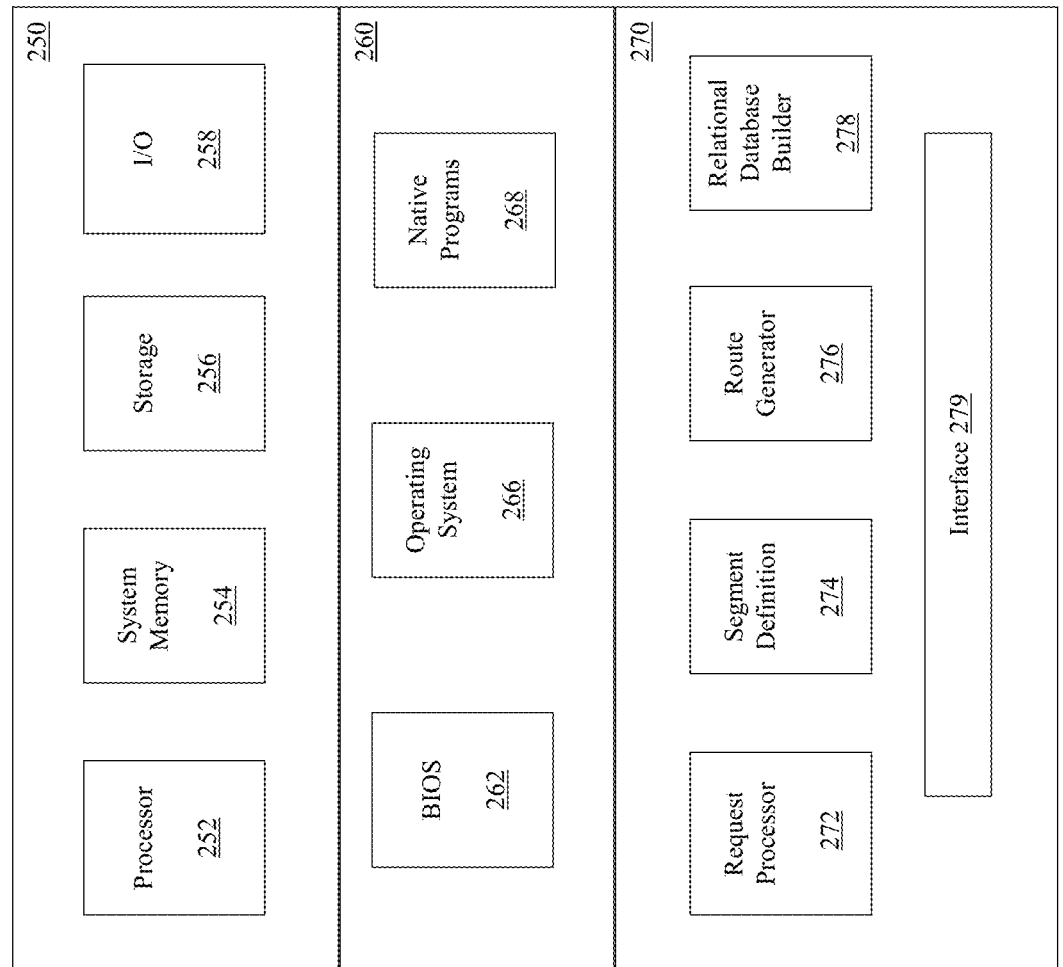
FIG. 2B is a block diagram illustrating components in the computer system implementing the disclosed technology.

FIG. 2B is a block diagram illustrating components in a computer system 200 implementing the disclosed technology according to certain embodiments. The computer system 200 may include one or more computers/servers 120 coupled to each other via a local network (e.g., network 115) and/or wide area network (e.g., network 110). As shown in FIG. 2B, the components include hardware components 250, such as one or more processors 252, one or more system memories 254, one or more storage units 256, and the I/O devices 258. The components further include general software applications 260, such as one or more basic input/output systems (BIOS) 262, one or more operating systems 266, and native programs 268. The components further include proprietary software components 270 specifically designed to implement the disclosed technology together with the other components of the computer system 200, including a request processor 272, a segment definition module 274, a route generator 276, a relational database builder 278, and an interface engine 279.

Figure 2C:
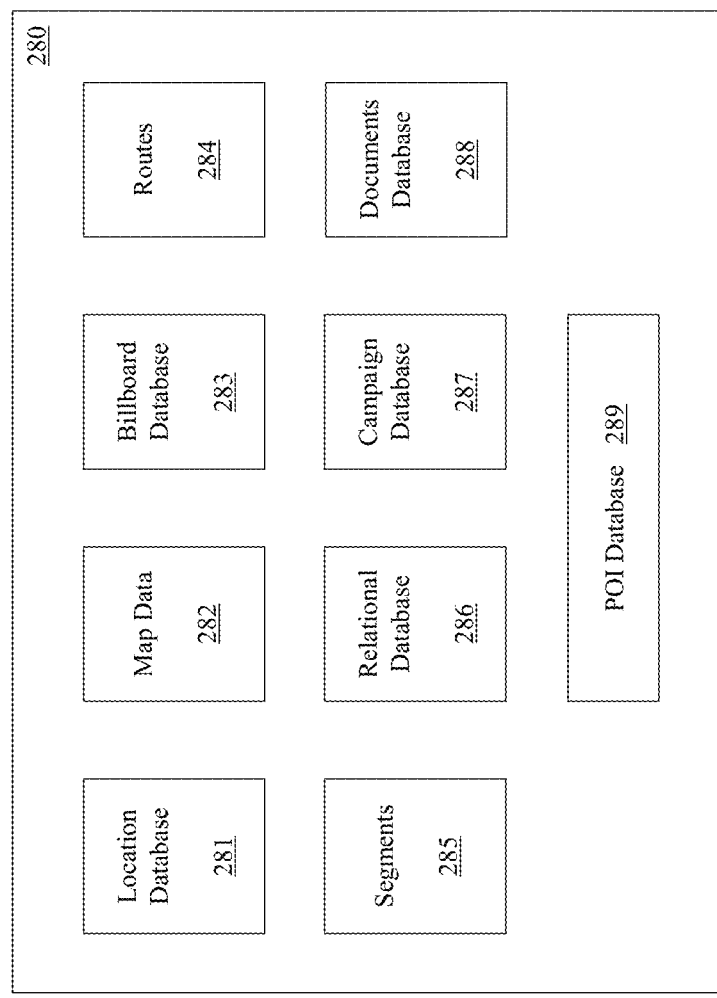
FIG. 2C is a block diagram illustrating data and databases in the storage associated with the computer system, according to certain embodiments.

FIG. 2C is a block diagram illustrating some of the data stores and/or databases 280 in the one or more storage units 256 of the computer system 200, according to certain embodiments. As shown, the data stores and/or databases 280 include a location database 281 storing therein historical data associated with mobile devices 130 communicating with the network 100, map data 282 including data about public roads in a geographical area, a billboard database 283 storing therein information about billboards (here the term "billboard" refers to billboard, commercial signs, business identifications, posters, electronic display screens and/or speakers, or any structure or means by which information is displayed visually and/or acoustically and/or otherwise to travelers on public roads, or any information thus displayed), a routes database 284 storing therein commute routes generated by the route generator 276, a segments database 285 storing therein definitions of segments of public roads (referred to hereafter as "road segment" or simply "segment"), a relational database 286 storing therein road segments as related to certain billboards or POIs, a campaign database 287 storing therein campaign data, a documents database 288 storing therein information documents or links to information documents for delivering to mobile devices 130 based on their locations, and a POI database 289 storing therein information about a plurality of points of interests, e.g., businesses, public facilities, etc. and spatial indices defining the boundaries thereof. The data stores and/or databases 280 can be in a same storage unit or in physically separate storage units.

Figure 2D:
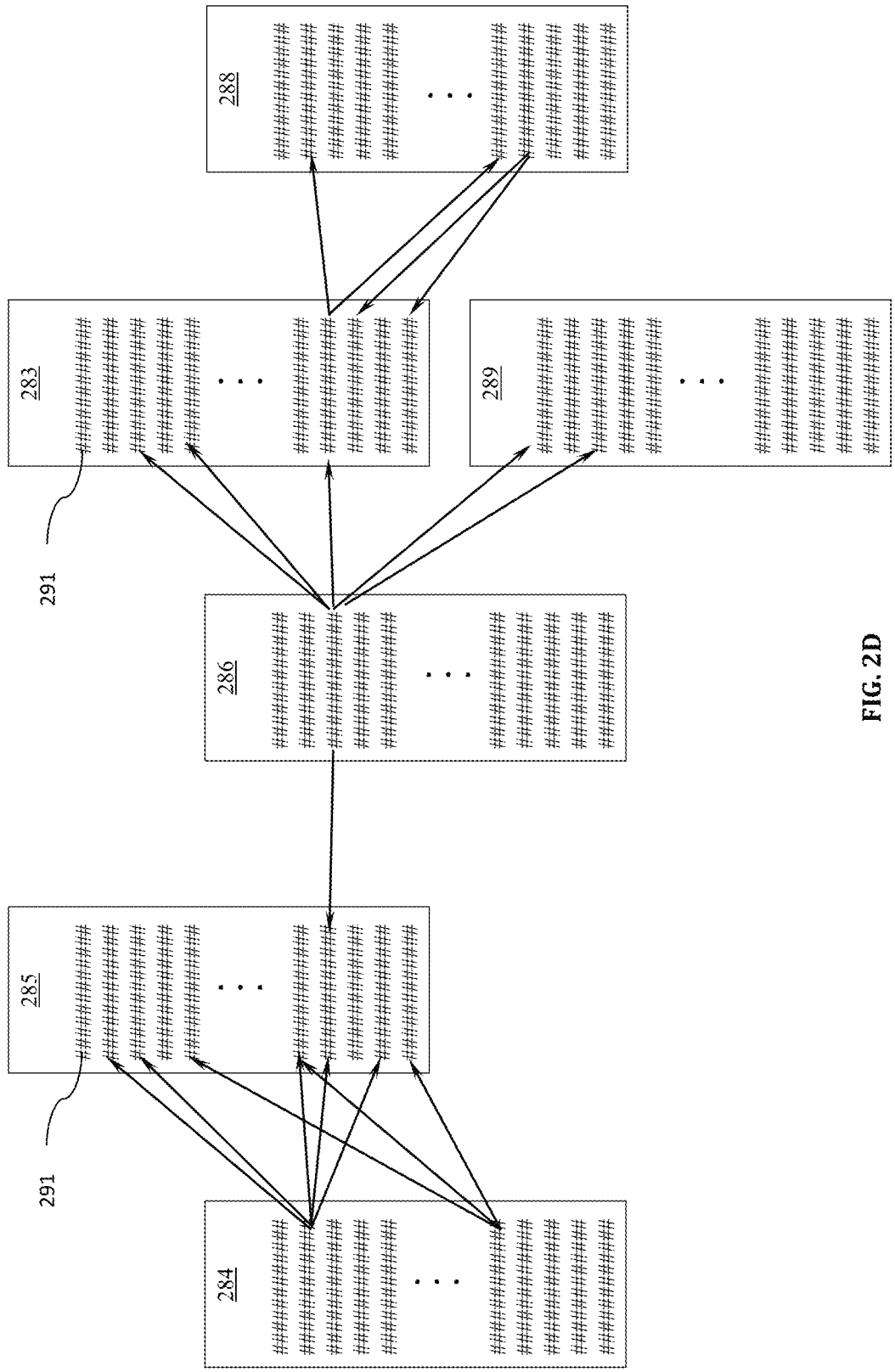
FIG. 2D is a block diagram illustrating schematically the inter-relations among the entries in some of the data stores and/or databases.

FIG. 2D is a block diagram illustrating schematically the inter-relations among the entries in some of the data stores and/or databases 280. As shown in FIG. 2D, each of the databases 283 284, 285, 286, and 288 include many entries 291, and an entry in one database may be related to or point to another entry in another database. For example, each entry in the segments database 285 includes data related to a particular road segment in a geographical area, and each entry in the routes database 284 includes data related to a particular commute route from one place to another in the geographic area. In certain embodiments, each commute route includes a sequence of road segments. Thus, each entry in the routes database points to or identifies a set of entries in the segments database 285.

The entries in the documents database 288 correspond to respective information documents or respective links to respective information documents stored in another database in the network 100. In certain embodiments, an information document can be in the form of, for example, an html/JavaScript file. A link to an information document can be, for example, a universal resource location (URL), which the mobile device or publisher can use to fetch the information document. For ease of description, the term "information document" herein means either the information document itself or a link to the information document. In certain embodiments, the documents database 288 includes information documents that are related to respective billboards in the billboards database 283, and/or information documents related to respective POIs in the POI database 289. An information document is related to a billboard if it includes information that's related to at least some of the information displayed on the billboard. For example, if a billboard displays an ad for a shoe brand and includes a picture of a shoe and a slogan such as "Jump, and your life will show up,", an information document related to this billboard may include a picture of a shoe of the same brand with the same slogan, or it may include a picture of a shoe of a competing brand with a similar slogan such as "Step up the games." Either way, the information document is related to the billboard because it is designed to take advantage of mobile users' exposure to the billboard. In certain embodiments, an information document can be related to one or more billboards. For example, more than one billboards may be used to display the same or similar information at different locations. Thus, when the information document is delivered to a mobile device and displayed on the mobile device, it may serve as another impression of the information displayed on the billboards or as a reminder of the information displayed on the billboards. Conversely, each entry in the billboards database 283 may correspond to one or more entries in the documents database 288, as more than one information documents may be created for a particular billboard. In certain embodiments, each entry in the billboards database 283 includes one or more identifications, links or pointers that points to one or more corresponding entries in the documents database.

Each entry in the relational database 286 associates one or more billboards in the billboards database 283 and/or one or more POIs in the POI database 289 with a particular segment by respective probability values. The probability value by which a particular billboard is associated with a particular segment indicates the likelihood of a traveler on the particular segment having come from or is proceeding to another road segment where the information displayed by the particular billboard is discernable. Thus, each entry in the relational database 286 points to or identifies a road segment in the segments database 285 and also points to or identifies one or more billboards in the billboards database 283. Alternatively or additionally, the each entry in the relational database 286 associates the one or more billboards and/or POIs to the particular segment by associating one or more information documents related to the one or more billboards and/or POIs with the particular road segment. Thus, each entry in the relational database 286 points to or identifies one or more entries in the documents database 288. Alternatively or additionally, each entry in the relational database 286 points to one or more other segments, which a traveler on a particular segment is likely to have come from or proceed to.

Figures 3A, 3B:
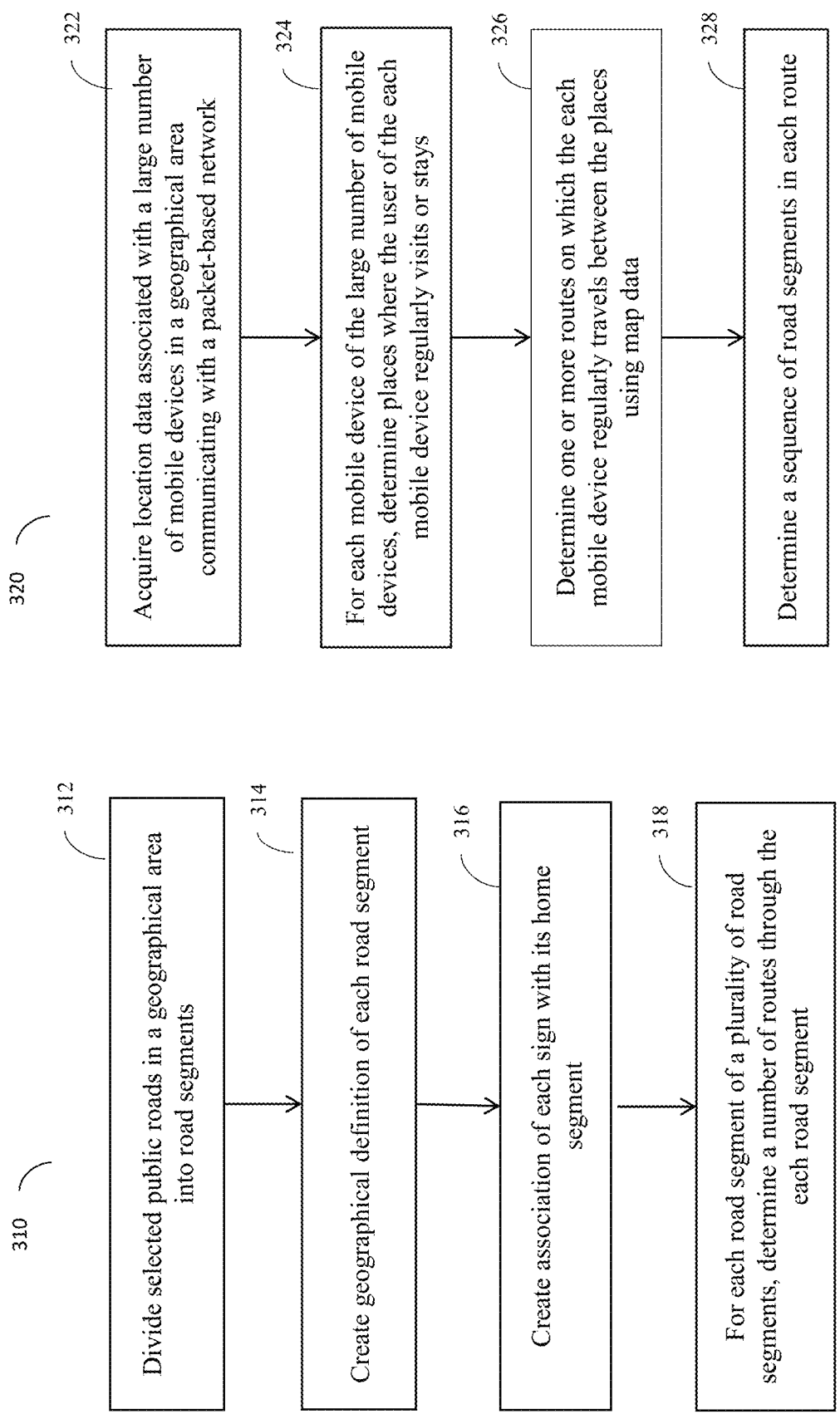
FIG. 3A is a flow diagram illustrating a process of a segment definition module according to certain embodiments.
FIG. 3B is a flow diagram illustrating a process of a route generator according to certain embodiments.
Figure 4A:
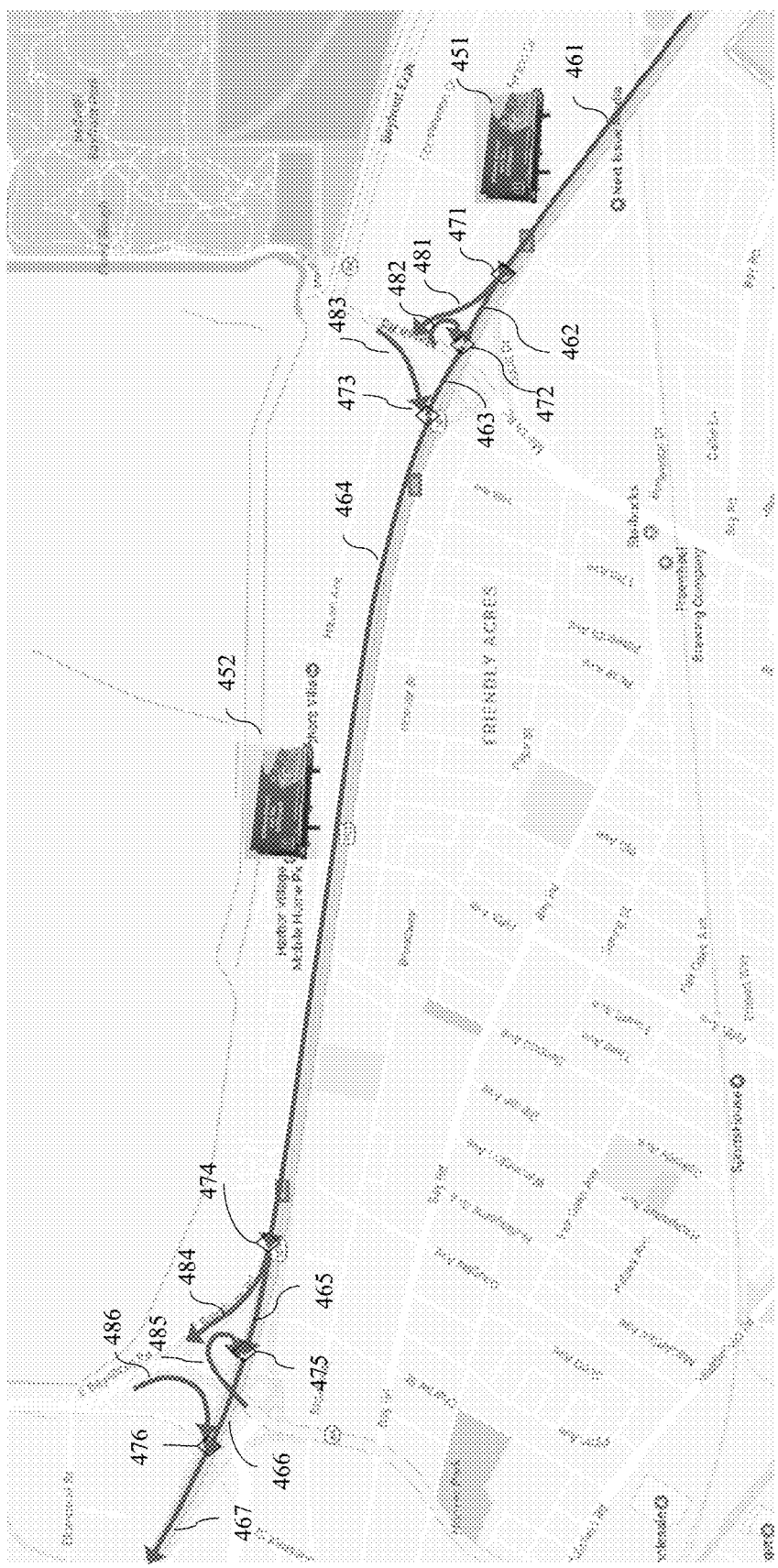
FIG. 4A is a map overlay diagram illustrating examples of road segments along a highway according to certain embodiments.

FIG. 3A is a flow diagram illustrating a process 310 of the segment definition module 274 according to certain embodiments. Process 310 includes blocks 312, 314, 316, and 318. At block 312, selected public roads in a geographical area are divided into road segments. The public roads may be selected based on associated amounts of traffic flow and/or their affinity to certain billboards, which are of interest to one or more mobile marketers. For example, FIG. 4A shows a few segments 461, 462, 463, 464, 465, 466, and 467 in the northbound direction of a section of the highway US 101 near Menlo Park, Calif., and a few road segments for the entry or exit ramps 481, 482, 483, 484, 485, and 486, which are joined to the highway at E/E points 471, 472, 473, 474, 475, and 476, respectively.

Figure 4B:
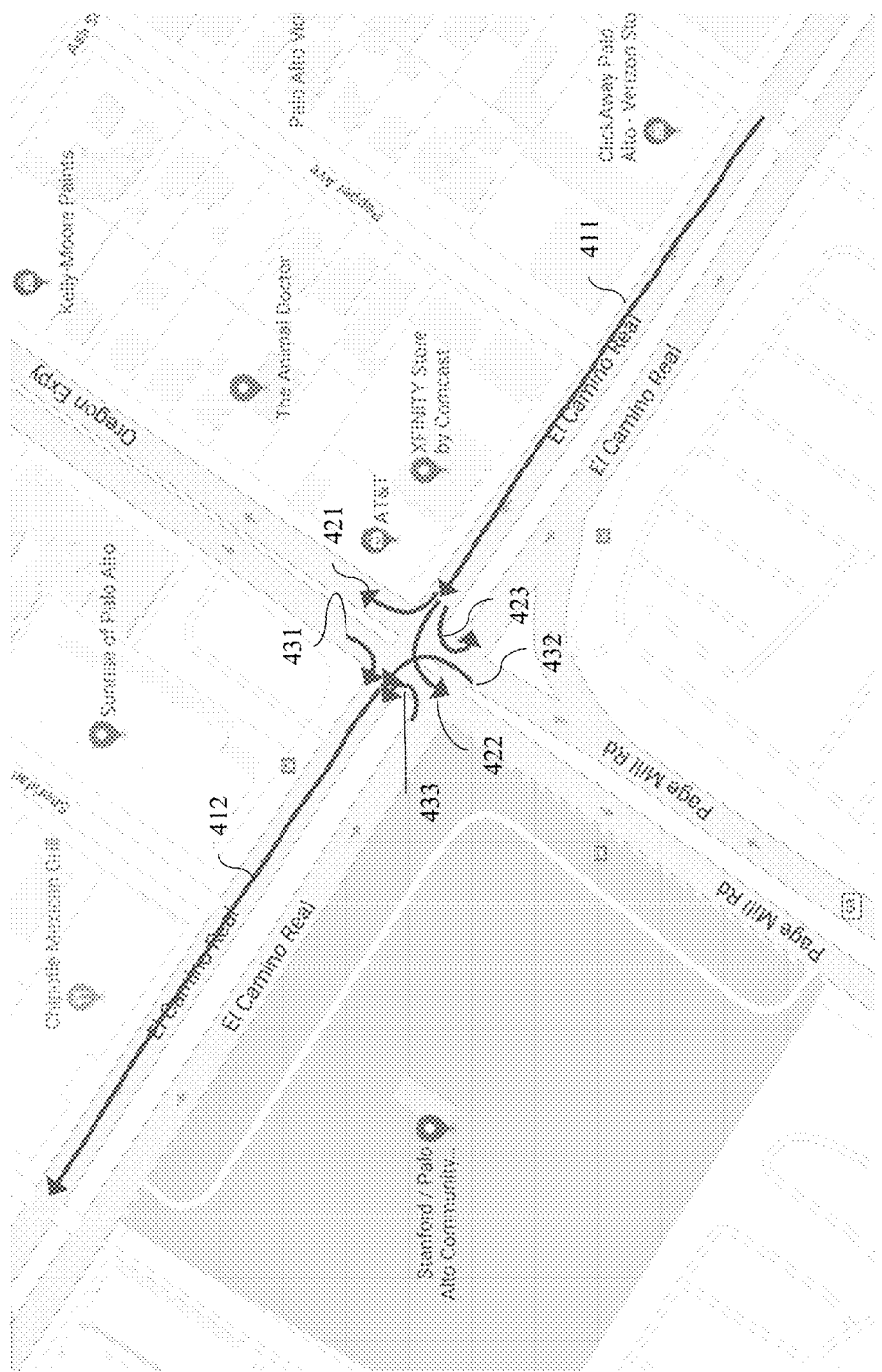
FIG. 4B is a map overlay diagram illustrating examples of road segments near an intersection according to certain embodiments.

FIG. 4B illustrates examples of multiple ways of entering and/or exiting a public road at an E/E point. As shown in FIG. 4B, a northbound section of El Camino Real near the intersection with Oregon Expy and Page Mill Rd in Palo Alto, Calif. are divided into two road segments, road segment 411 before the intersection and road segment 412 after the intersection. FIG. 4B also shows road segments 421, 422, and 423 for exiting northbound El Camino Real at the intersection by right turn, left turn and U-turn, respectively. FIG. 4B further shows road segments 431, 432, and 433 for entering northbound El Camino Real at the intersection by right turn from Oregon Expy, left turn from Page Mill Road, and U-turn from southbound El Camino Real, respectively.

Referring back to FIG. 3A, at block 314, geographical definition of each of the road segments is created and stored in the segments database 285. As illustrated in FIG. 5, which is a table illustrating examples of some of the content in the segments database 285, according to certain embodiments, each road segment is identified by a segment ID and is defined by the city/state in which the road segment is situated, the name of the public road and direction of travel, of which the road segment is a part, and spatial index outlining the boundary of the road segment, which can be derived using map data. If a road segment is home to one or more billboards, meaning the one or more billboards are placed by or over the road segment and are used to display information to travelers on the road segment, at block 316, the one or more billboards are determined and are associated with the road segment in the segments database 285, as also shown in FIG. 5.

In certain embodiments, the road segments are defined taking into account the sizes of the resulting road segments, which can be selected based on the designated maximum speeds of the respective roads and the amount of traffic on the respective roads. The division also takes into account entries and exits along the roads so that a major entry or exit or intersection is between two adjacent road segments and not in the middle of any road segment.

Figure 4C:
FIG. 4C is a map overlay diagram illustrating locations detected over a period of time using location data associated with a mobile device.

FIG. 3B is a flow diagram illustrating a process 320 of the route generator 276 according to certain embodiments. Process 320 includes blocks 322, 324, 326, and 328. At block 322, location data associated with a large number of mobile devices in a geographical area (e.g., the San Francisco Bay Area) communicating with a packet-based network are collected and stored in the location database 281. FIG. 4C illustrates some of the mobile device locations (represented by the solid dots) detected using the location data associated with a mobile device over a period of time (e.g., 1 week). After a sufficient amount of location data are collected over a period of time (e.g., one month), a block 324, the location data for each particular mobile device is used to determine routes the user of the mobile device may have taken during the preset time period. In certain embodiments, the location data for each particular mobile device includes detected locations of the mobile device with various time stamps during a preset time period (e.g., in the last 30 days). The routes can be derived from the location data collected from information requests associated with the particular mobile device or location updates provided by the particular mobile device with a background app installed and running to provide automatic location updates periodically. The location data may indicate that the user of the particular mobile device regularly spends substantial time in a few places, and may further show routes taken by the user of the particular mobile device as he or she travels among the few places. If the particular mobile device is used during traveling or has background apps running while the user is traveling along these routes, the routes can be traced, defined and stored as routes for the particular mobile device, as shown in FIG. 4C, where each blue dot 400 is a location point representing an instance of a detected location for the particular mobile device.

Figure 4D:
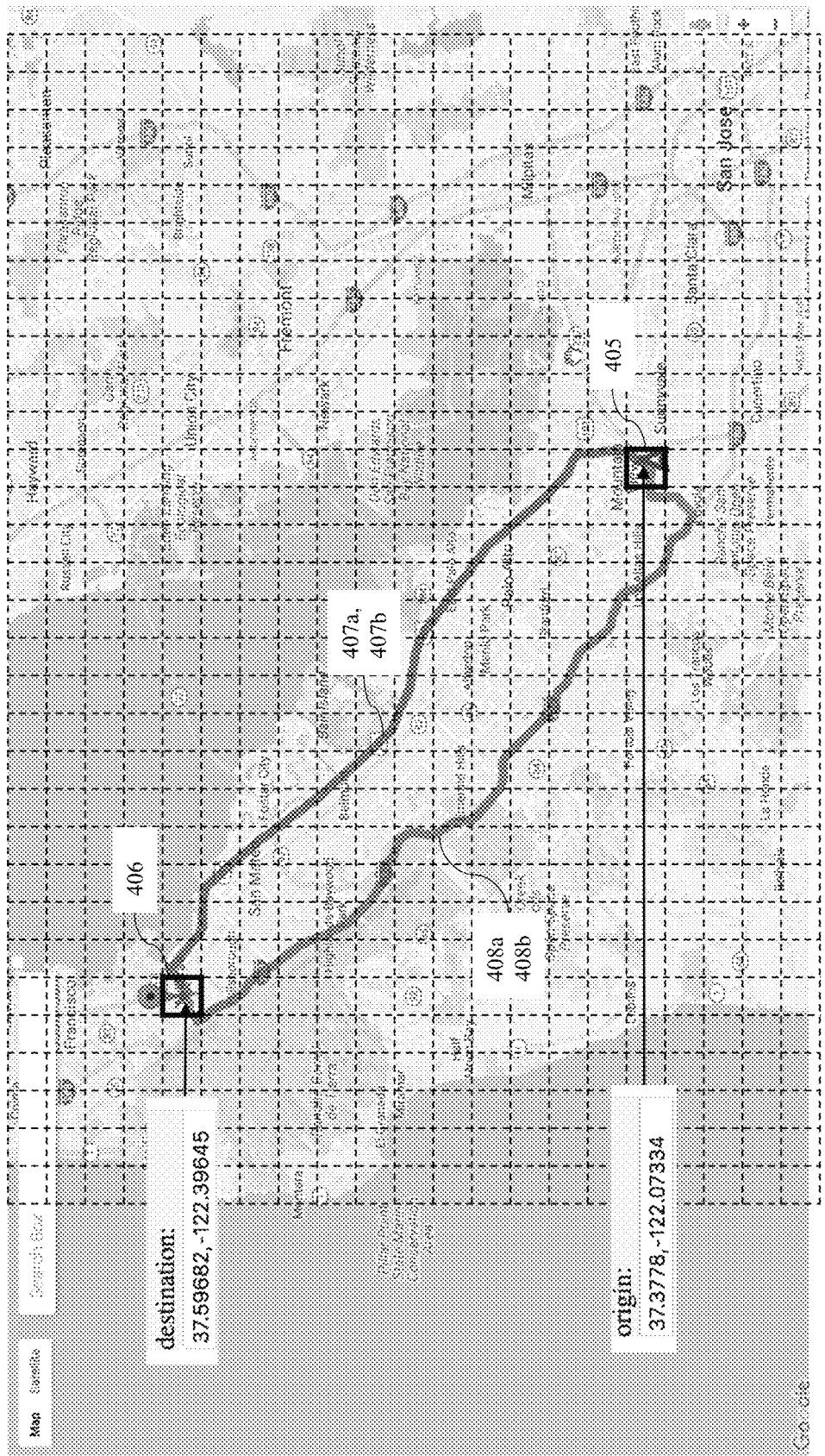
FIG. 4D is a map overlay diagram illustrating how map mobile device location points are mapped into parcels according to certain embodiments.

Additionally or alternatively, the routes can be determined by first determining the places where the user of the particular mobile device routinely spends substantial time. This can be done by defining a geographical region in which most of the location points associated with the particular mobile device are located; dividing the geographical region into parcels; and map the plurality of location points into the parcels, as shown in FIG. 4D. The density of the location points in each parcel can thus be determined, and a location parcel having significantly higher density than at least some of its surrounding parcels can be selected. The center of weight for the location points in the selected parcel(s) can then be used to define a place for the mobile user. By examining the time stamp of the information requests from which the location points in the selected parcel are extracted, the place can be determined as the "home," the "workplace," or simply one of several key places of the mobile user. For example, as shown in FIG. 4C, places 401, 402, 403, and 404 can be determined as locations where the user of the particular mobile device regularly visits or stays during the preset time period. In the example shown in FIG. 4D, at least a first place 405 and a second place 406 are determined as the mobile user's workplace (shown as "origin") and the mobile user's home (shown as "destination").

Although FIG. 4D shows that the parcels are about equal in size, in practice, the parcels can be different in size. For example, smaller sized parcels can be used where the location points are denser or where the area is more densely populated, and larger sized parcels can be used where the location points are sparse or where the area is less densely populated. Also, when multiple adjacent parcels have comparable densities that are significantly higher than surrounding parcels, the multiple adjacent parcels can be combined and the center of weight of the location points in the multiple adjacent parcels are used to define a place for the mobile user. Further details on how to detect mobile user home and office locations based on historical request data can be found in co-pending U.S. Patent Application entitled "Method and Apparatus for Delivering Publicly Displayed Information to Mobile Devices based on Mobile User Travel Routes," filed on even date herewith, which is incorporated herein by reference in its entirety.

In certain embodiments, with the places for a mobile user determined, one or more routes can be estimated between the places. At block 326, commute routes between the places are determined using the map data. For example, as shown in FIG. 4D, between the mobile user's workplace (shown as "origin") and the mobile user's home (shown as "destination"), one or more shortest routes can be determined using publicly available map data. In certain embodiments, more than one set of commute routes are determined if there are more than one ways of traveling from one of the two places to the other that are almost equally preferable. For example, as shown in FIG. 4D, a set of routes 407a and 407b can be used to travel back and forth between places 405 and 406 via US 101, and another set of routes 408a and 408b can be used to travel back and forth between places 405 and 406 via HW 280. This process can be repeated between any two of the mobile user's key places to estimate the routes the mobile user routinely takes, and for each of a large number of mobile devices. As a result, millions of routes can be generated and stored in the routes database 284.

Figure 4E:
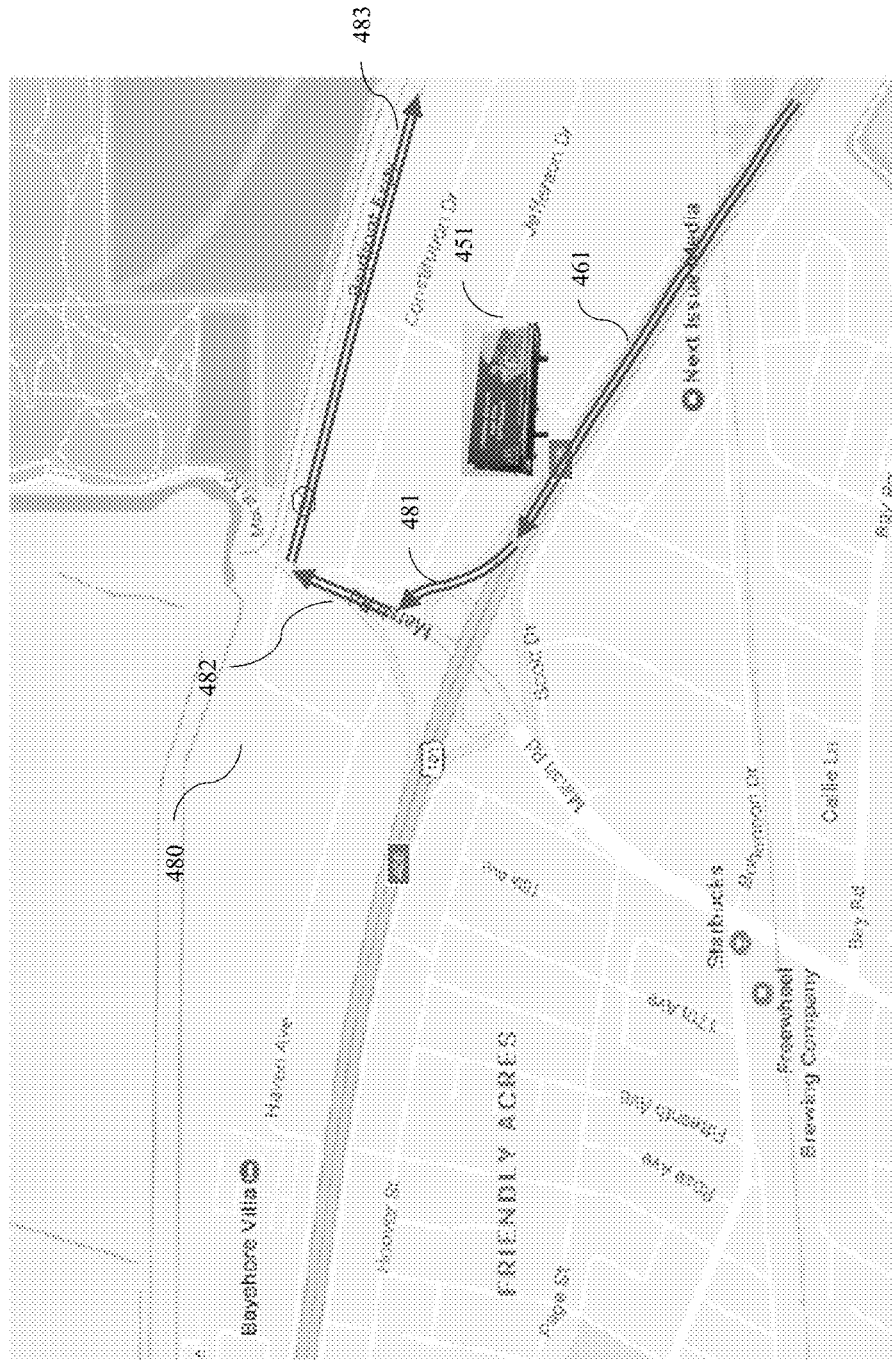
FIG. 4E is combination of a table and a map overlay diagram illustrating a portion of a commuter route as a sequence of road segments according to certain embodiments.

At block 328, each route between an origin and a destination is defined as a sequence of road segments consistent with the segments in the segments database 285. For example, as shown in FIG. 4E, each route, e.g., route 480 between an origin (e.g., a latitude/longitude pair) and a destination (e.g., another latitude/longitude pair), has a route ID and includes a sequence of road segments, seg 1, seg 2, . . . , seg n, each being identified by its respective segment ID. FIG. 4 also shows some of the sequence of road segments in a map overlay diagram as road segments 461, 481, 482 and 483. As shown in FIG. 4E, road segment 461 is a section on US 101 North, road segment 481 is an exit ramp off US 101 at Marsh Road, road segment 482 is a section of March Road from the exit ramp to CA 84 (Bayfront Exwy), and road segment 483 is a section of CA 84 East. The routes thus defined are stored in the routes database 284. In certain embodiments, the data in the routes database 284 can be used by the process 310 to determine at block 318, for each respective segment, a number of routes including the respective segment, or a number of routes passing through the respective segment, and this number can be associated with the respective segment in the segments database 285, as illustrated in FIG. 5.

Using the data in the routes database 284 and segments database 285, road traffic statistics can be derived, including the percentage of traffic on one road segment proceeding to or coming from another nearby road segment. Thus, in certain embodiments, each particular road segment can be associated with to another nearby road segment by a percentage value corresponding to a percentage of the traffic on the particular road segment proceeding to or coming from the other nearby road segment. This percentage value can be used to as a probability value to indicate a degree of likelihood that a traveler on the particular road segment has come from or is going to travel through the other nearby road segment.

Figure 6:
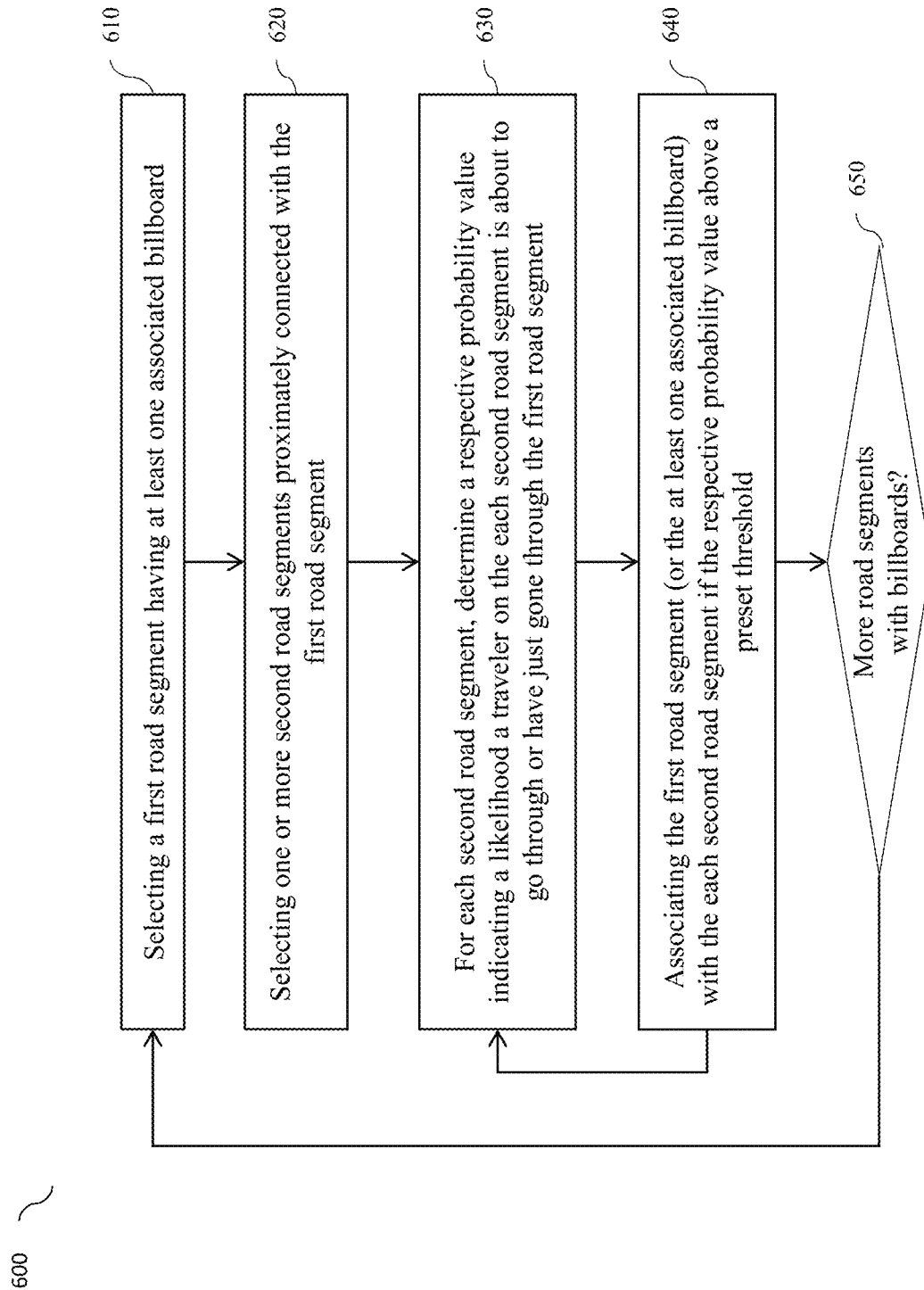
FIG. 6 is a flow diagram illustrating a process for building a relational database according to certain embodiments.

FIG. 6 is a flow diagram illustrating a process 600 of the relational database builder 278 according to certain embodiments. Process 600 includes blocks 610, 620, 630, 640 and 650. At block 610, a first road segment of a first public road is selected. The first road segment is a home segment to at least one billboard, i.e., each of the at least one billboard is discernable by travelers on the first road segment.

At block 620, one or more second road segments proximately connected to the first road segment are identified. For example, the one or more second road segments can include a road segment on the same first public road that is either adjacent the first road segment or separated from the first road segment by one or more other segments on the first public road. The one or more second road segments can also include a road segment from a different public road, such as, for example, an entrance or exit ramp to or from the first public road, or a road segment from another public road that intersects with the first public road.

At block 630, a probability value is determined for each of the one or more second road segments. The probability value indicates the likelihood of a traveler on the each of the one or more second road segments is about to travel to or has just come from the first road segment. In certain embodiments, this probability value is determined based on the data in the routes database 284.

Figure 7A:
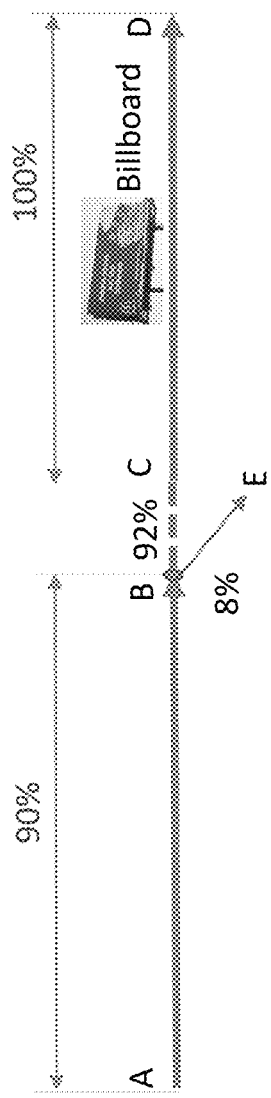
FIGS. 7A-7D are schematic diagrams of examples of road segments and how they are related to each other based on routes data according to certain embodiments.

For example, FIG. 7A shows examples of road segments, AB, CD, and BE, any two of which may or may not be segments of a same public road. Road segment CD is a home segment to at least one billboard and is an example of the first road segment in the above discussion, while segments AB is an example of one of the one or more second road segments in the above discussion. Road segments AB and CD can be adjacent to each other or separated from each other by one or more other road segments. The dashed line BC represents an intersecting point between road segments AB and CD and/or one or more road segments between road segments AB and CD. In certain embodiments, road segments AB, BC, and CD together form a route A-B-C-D, which can be a shortest route or commonly used route between point A and point D. BE represents one or more ways by which a traveler on road segment AB can travel away from route A-B-C-D. BE can include one or more road segments, such as one or more exit ramps, one or more turns into one or more intersecting roads, or simply the next segment down a road from AB.

Figure 7B:
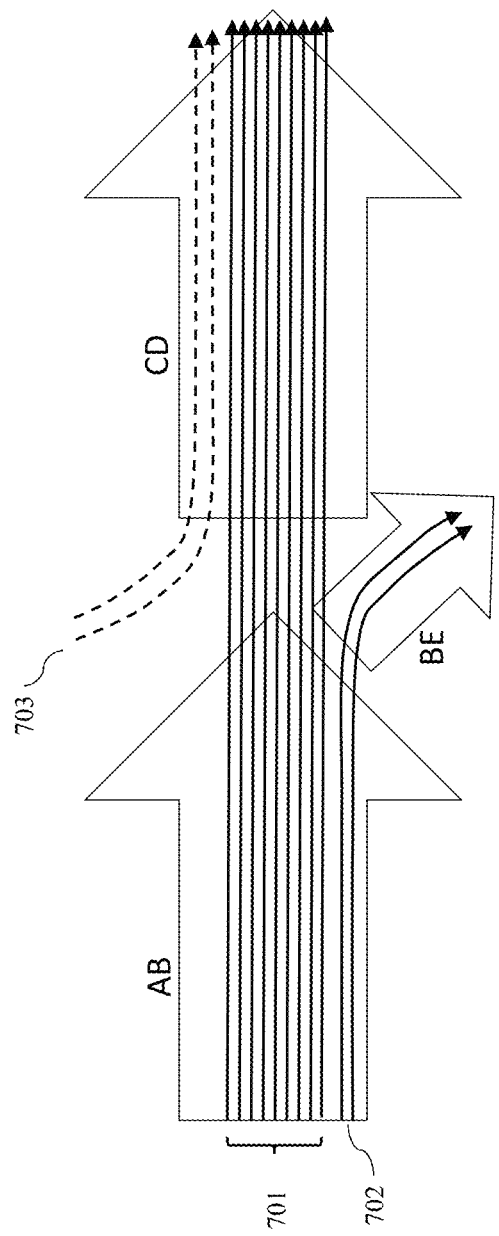

FIG. 7B illustrates the routes through segments AB, CD, and BE according to data in the routes database. As shown in FIG. 7B, the routes through segment AB include routes 701, which end up going through segment CD, and routes 702, which end up exiting route A-B-C-D via segment(s) BE. FIG. 7B also shows routes 703 that merge into route A-B-C-D via other intersecting segments (not shown). These routes 703 are irrelevant to the calculation of the probability of a traveler on AB proceeding to CD. The percentage of routes 701 among all of the routes through AB can be determined by identifying the routes including segment AB and determining which ones of those routes also include segment CD. This percentage can also be determined by counting the number of routes including segment AB and the number of routes exiting A-B-C-D between point B and point C. Also, based on the number of routes on road segment AB and the number of routes on road segment(s) BE, the probability of a traveler on AB continuing to the next segment on the route A-B-C-D at point B can be estimated. For example, if segment AB has 1000 routes and the total number of routes through segment(s) BE are 80, it can be estimated that 92% of AB's traffic would continue to the next segment on route A-B-C-D at point B (i.e., 8% of the traffic on AB exits route A-B-C-D via EF).

Figure 8A:
FIGS. 8A-8D are map overlay diagrams of various road segments and their relational attributes according to certain embodiments.

If there are no other exits from route A-B-C-D, as shown in FIG. 8A, then the probability of a traveler on AB proceeding to CD is 92%, meaning that a mobile user on road segment AB would have a 92% probability of being in a position to see the billboard on segment CD. If there are multiple exits on route A-B-C-D, then the probability of a traveler proceeding onto the next segment on route A-B-C-D is estimated at each of the exits, and the probability of a traveler on AB proceeding to CD can be estimated by multiplying the probabilities at the multiple exits. Thus, in the relational database 286, segment CD, or the billboard on segment CD, or an information document related to the billboard, is associated with the road segment AB by the estimated probability value. Road segment CD or the billboard or the corresponding information document can also be associated with other nearby road segments (e.g., road segments within a 2-mile radius from the billboard) with the corresponding probability values. Of course, a user on road segment CD would have a 100% probability of being in a position to see the billboard, and a user on road segment BE would have 0% probability of being in a position to see the billboard.

Figure 7C:
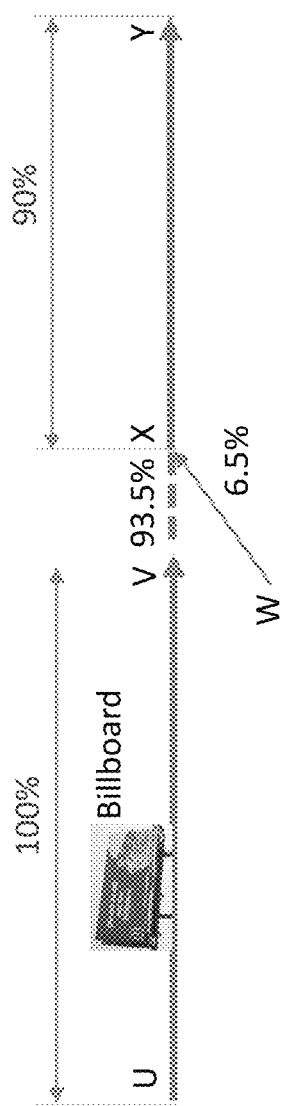

FIG. 7C shows a few other road segments UV, XY, and WX, any two of which may or may not be segments of a same public road. Road segment UV is another example of the first road segment XY, while road segment XY is another example of one of the one or more second road segments in the above discussion. Road segments UV and XY can be adjacent to each other or separated from each other by one or more other road segments. The dashed line VX represents an intersecting point between road segments UV and XY if they are adjacent each other, or one or more road segments between road segments UV and XY if they are not adjacent each other. In certain embodiments, road segments UV, VX, and XY together form a route U-V-X-Y, which can be a shortest route or commonly traveled route between point U and point Y. WX represents one or more ways by which a traveler can enter road segment XY from another route. WX can include one or more road segments, such as one or more entrance ramps, or one or more ways to turn into road segment XY from one or more intersecting roads, or a previous segment up a road from XY.

Figure 7D:
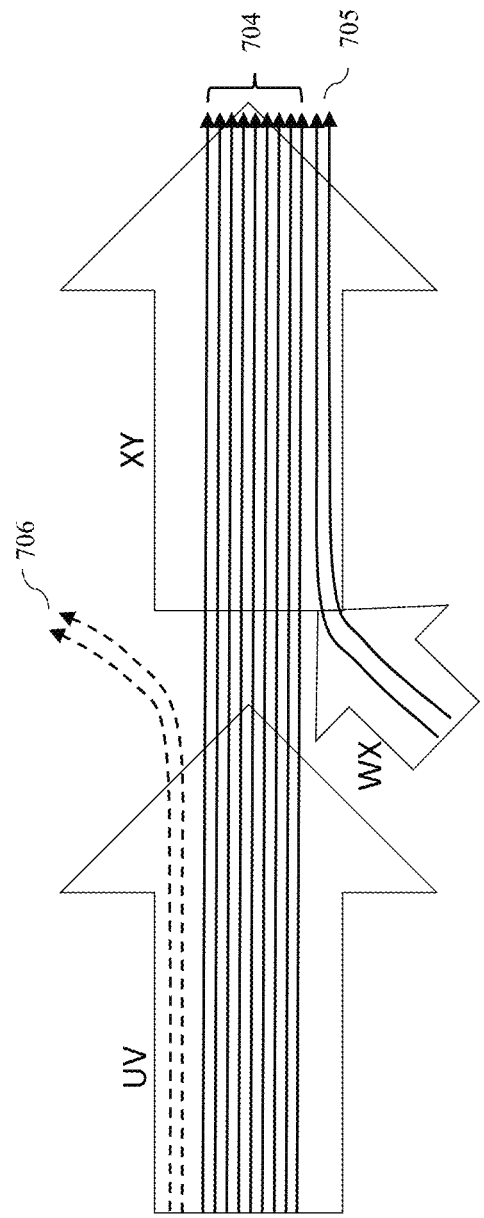

FIG. 7D illustrates the routes through segments UV, XY, and WX according to data in the routes database. As shown in FIG. 7D, the routes through segment XY include routes 704, which came straight from segment UV, and routes 705, which merged into route U-V-X-Y via segment(s) WX. FIG. 7D also shows routes 706 that exit route U-V-X-Y via other intersecting segments (not shown). These routes 703 are irrelevant to the calculation of the probability of a traveler on XY having come from segment UV. The percentage (e.g., 93.5%) of the number of routes through segment XY coming from segment UV can be determined by identifying the routes including segment XY and determining which ones of those routes also include segment UV. This percentage can also be determined by counting the number of routes including segment XY and the number of routes entering route U-V-X-Y between point V and point X. Also, based on the number of routes on road segment XY and the number of routes on road segment(s) WX, the probability of a traveler entering road segment XY from an adjacent road segment on route U-V-X-Y can be estimated. For example, if segment XY has 1000 routes and the total number of routes through segment(s) WX are 65, it can be estimated that 93.5% of XY's traffic would have come from the adjacent road segment on route U-V-X-Y (i.e., 6.5% of the traffic on XY came from WX).

Figure 8B:
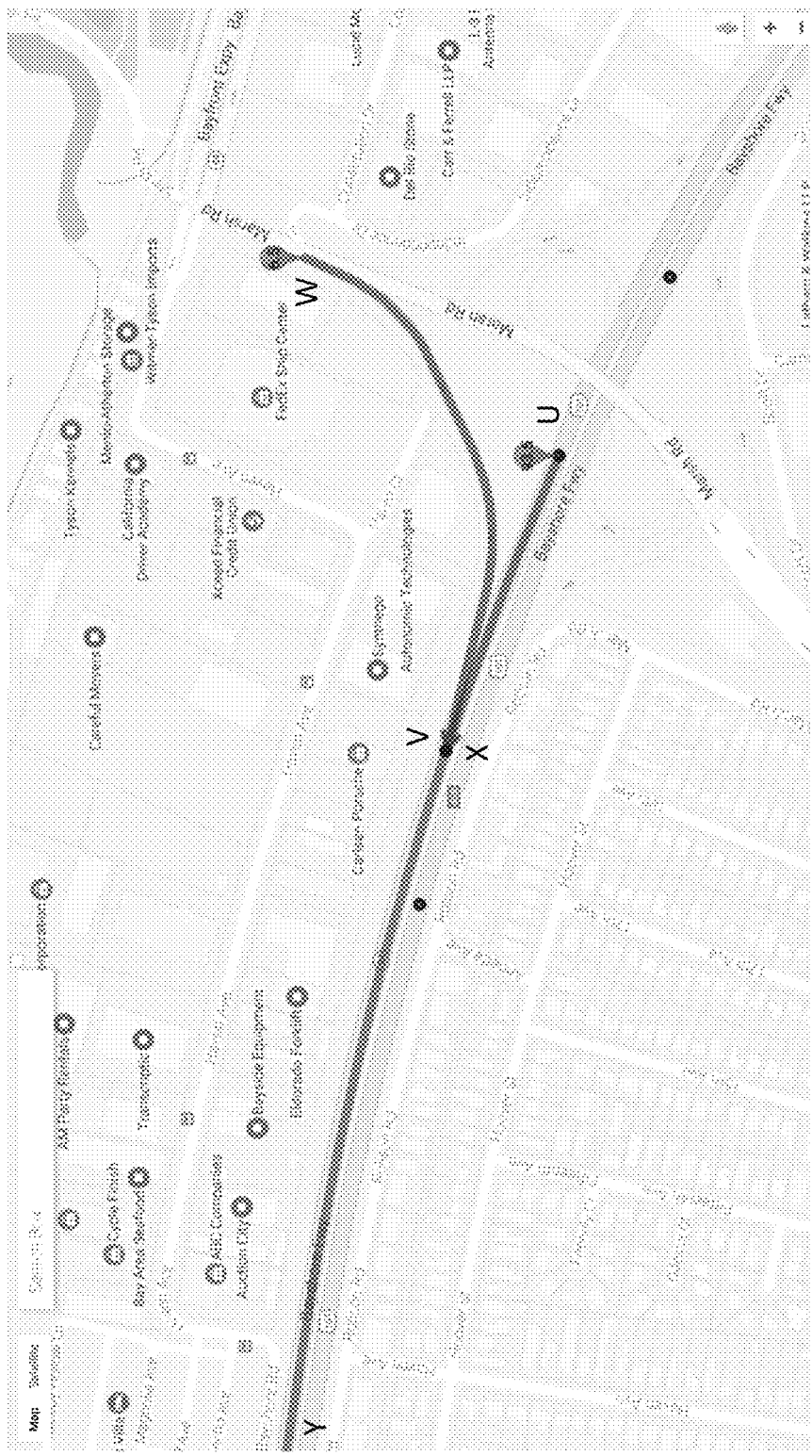

If there are no other entrance to route U-V-X-Y, as shown in FIG. 8B, then the probability of a traveler on XY having been on UV would be 93.5%, meaning that a mobile user on road segment XY would have a 93.5% probability of having been in a position to see the billboard on segment UV. If there are other entrance(s) on route U-V-X-Y, then the probability of a traveler on a segment on route U-V-X-Y immediately after each entrance to the route having proceeded from the segment on route U-V-X-Y immediately prior to the each entrance is estimated at the each entrance, and the probability of a traveler on XY having been on UV can be estimated by multiplying the probabilities corresponding to these entrances. Thus, in the relational database 286, segment UV, or the billboard on segment UV, or an information document related to the billboard, or a POI or an information document related to the POI accessible via segment UV is associated with the road segment XY by the estimated probability value. Road segment UV or the billboard or the POI of the corresponding information document can also be associated with other nearby road segments (e.g., road segments within a 2-mile radius from the billboard) with the corresponding probability values. Of course, a user on road segment UV would have a 100% probability of being in a position to see the billboard, and a user on road segment WX would have 0% probability of being in a position to see the billboard.

For example, as shown in FIG. 4A, since all of the traffic on each of road segments 462, 463, 482 and 483 ends up on road segment 464, and all of the traffic on each of road segments 465 and 484 comes from road segment 464, the information document corresponding to the billboard 452 is associated with each of these road segments with a probability value of 100%. On the other hand, because of the exit ramp 481, only some of the traffic on road segment 461 proceeds to road segment 464. Thus, the billboard 452 is associated with the road segment 461 with a probability value less than 100%. Likewise, because of the entrance ramps 485 and 486, only some of the traffic on road segment 467 actually comes from road segment 464. Thus, the billboard 452 is associated with the road segment 467 with a probability value less than 100%.

Figure 8C:
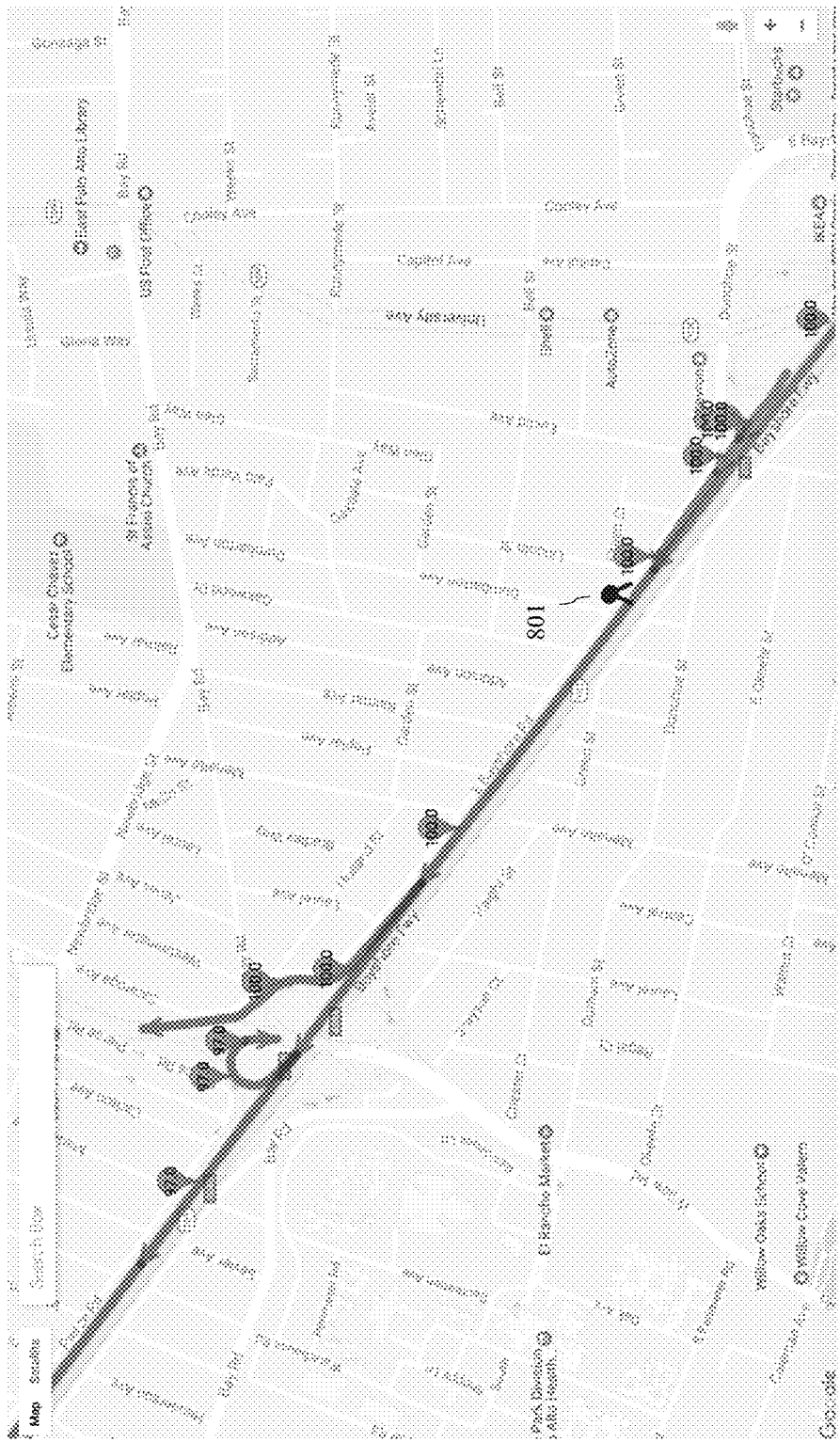
Figure 8D:
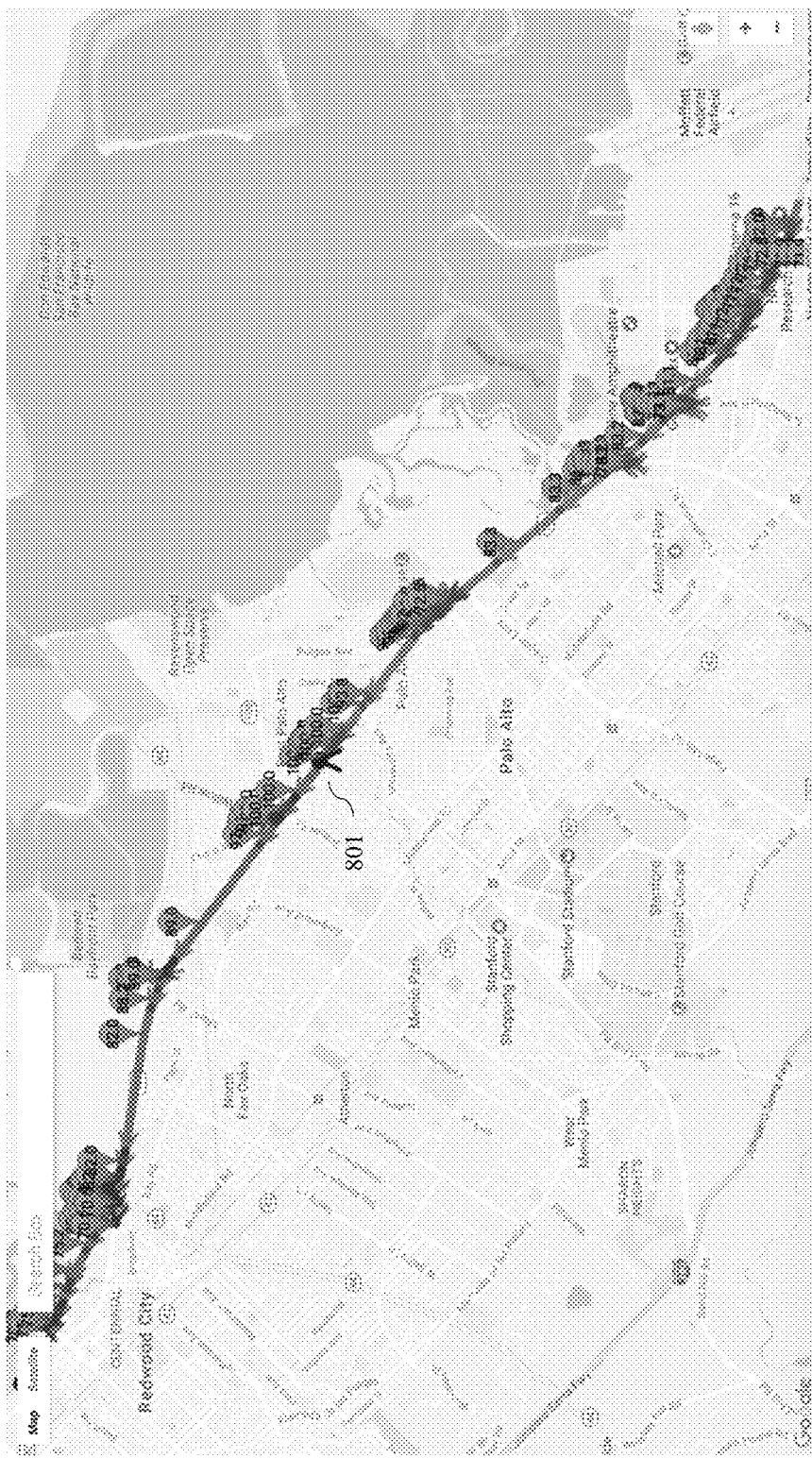

FIG. 8C illustrates a billboard 801 placed by US 101 facing the northbound traffic between University Ave. in Palo Alto and Willow Road in Menlo Park, Calif., being associated with nearby road segments (including its home segment) by respective probability values. The number of road segments associated with a certain billboard in the relational database 286 can be adjusted by adjusting a threshold for the probability values. The probability thresholds for different billboards can be different. For example, a billboard at a high traffic road segment can have a probability threshold significantly higher than a billboard at a low traffic road segment. Furthermore, the probability threshold for the same billboard can be different depending on the time of the day, or the information displayed (if the displayed information is readily changeable, as in the case of an electronic display). For example, during higher threshold (e.g., 97%) can be set during commute hours (as shown in FIG. 8C), while lower threshold (e.g., 70%) can be set during other times to include more road segments and thus a larger mobile audience (as shown in FIG. 8D). The probability thresholds for the billboards can also depend on other factors such as campaign budgets, etc., as specified in the campaign database 287.

Thus, in certain embodiments, each road segment near a billboard can be associated with the billboard (or a link to an information document related to the billboard) with a probability value representing the probability of a mobile user on the each road segment seeing or having seen the billboard, and such associations are stored in the relational database 286. The probability of a mobile user on a road segment seeing or having seen a billboard on another road segment is determined based on the percentage of the traffic on the road segment proceeding to or having come from the other road segment, and the percentage is determined based on estimated routes taken by a large number of mobile users. The routes are estimated using location data associated with a large number of mobile devices interacting with computer systems in a network.

FIG. 9A is a table illustrating examples of the content in the relational database 286 according to certain embodiments. As shown in FIG. 9A, the relational database 286 stores information of a plurality of segments each having one or more document (Doc) IDs associated therewith by corresponding probability values (P/V). Each Doc ID provided an identification or link to an information document (e.g., advertisement document) corresponding to a billboard associated with the segment. The information document includes information displayed on the corresponding billboard. In certain embodiments, instead of Doc IDs, billboard IDs can be used to link each segment to the documents corresponding to the billboards associated with the segment.

Figure 9B:
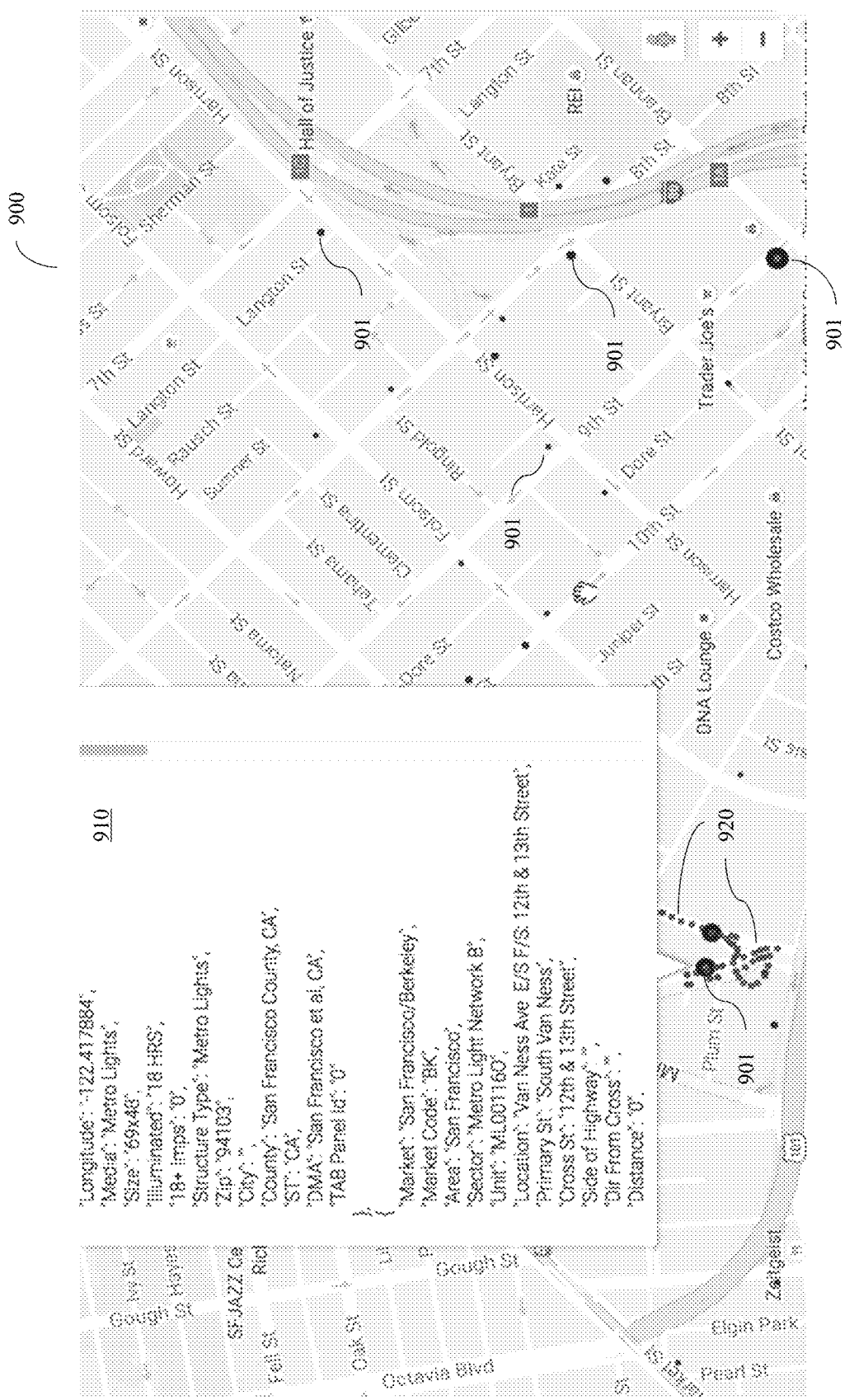
FIG. 9B is a screen shot of a graphic user interface (GUI) for accessing the data in the billboard database and the relational database according to certain embodiments.
Figure 9C:
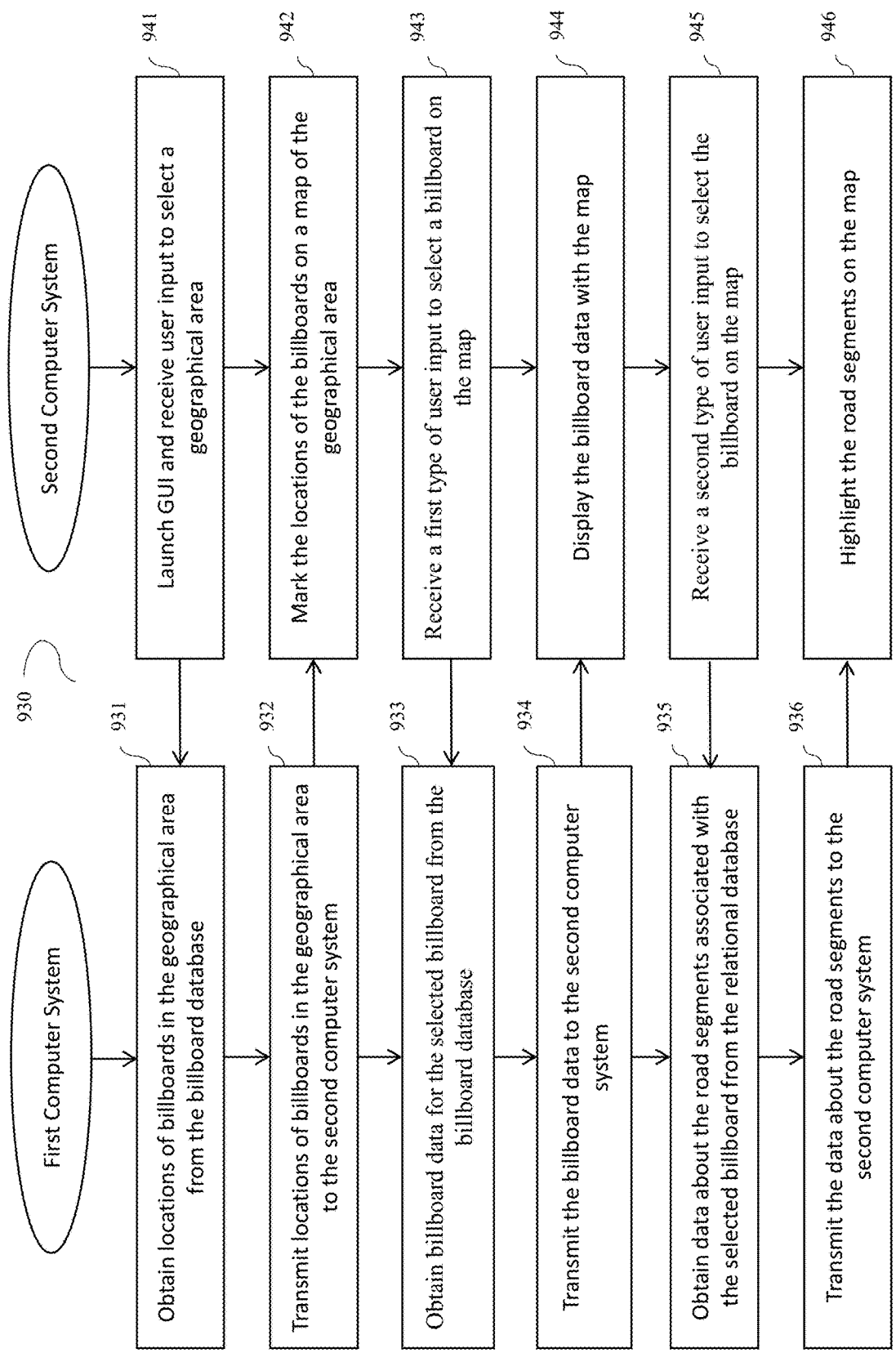
FIG. 9C is a flowchart illustrating a process for providing the GUI according to certain embodiments.

In certain embodiments, a graphic user interface (GUI) is enabled using the Interface engine 279 to help mobile marketers to access the data in the billboard database 283 and the relational database 286. In certain embodiments, the GUI can be provided by the computer system 200 running the interface engine 279, or any of the other computer system 120 coupled to the computer system 200 via the packet-based network 100. The computer system 120 can run an application program that interacts with the interface engine 279 in the computer system 200 to provide the GUI. FIG. 9C is a flowchart illustrating a process 930 performed by a first computer system 200 and a second computer system 120 to provide the GUI at the second computer system. Process 930 includes blocks 931 through 936 at the first computer system and blocks 941 through 946 at the second computer system.

At block 941, the GUI is launched at the second computer system and a user input to select a geographical area is received via the GUI and transmitted to the first computer system. In response, locations of billboards in the geographical area is obtained by the interface engine 279 at block 931 from the billboards database 283, and transmitted at block 932 to the second computer system. At block 942, the billboards are displayed via the GUI as hyperlinked markers at respective locations at which the billboards are physically disposed on a map of the geographical area, as shown in FIG. 9B. In the example shown in FIG. 9B, the billboards are highlighted as blue dots 901 of various sizes corresponding to the physical sizes of the billboards. At block 943, a first type of user input to select a billboard is received and transmitted to the first computer system. The first type of user input can be made by, for example, the user of the GUI left-clicking on a blue dot corresponding to the selected billboard with the mouse of the second computer system. In response, the interface engine 279 obtains at block 933 data about the selected billboard from the billboard database 283 and transmits at block 934 the data to the second computer system.

At block 944, the GUI displays the data in, for example, a pop-up window 910 over the map, as shown in FIG. 9B. The user can scroll up and down the pop-up window to see all of the data related to the selected billboard in the billboard database 283. At block 945, a second type of user input to select the billboard is received via the GUI and transmitted to the first computer system. The second type of user input can be made by, for example, the user of the GUI right-clicking on the blue dot corresponding to the billboard with the mouse of the second computer system. In response, the interface engine 279 obtains at block 935 data about the road segments associated with the selected billboard from the relational database 286, and transmits the data at block 936 to the second computer system. At block 946, the GUI highlights the associated road segments 920 using, for example, dotted lines in a contrasting color on the map. The GUI allows the user to change the geographic area in the display by zooming in and out and by moving the map around using the mouse.

Figure 10:
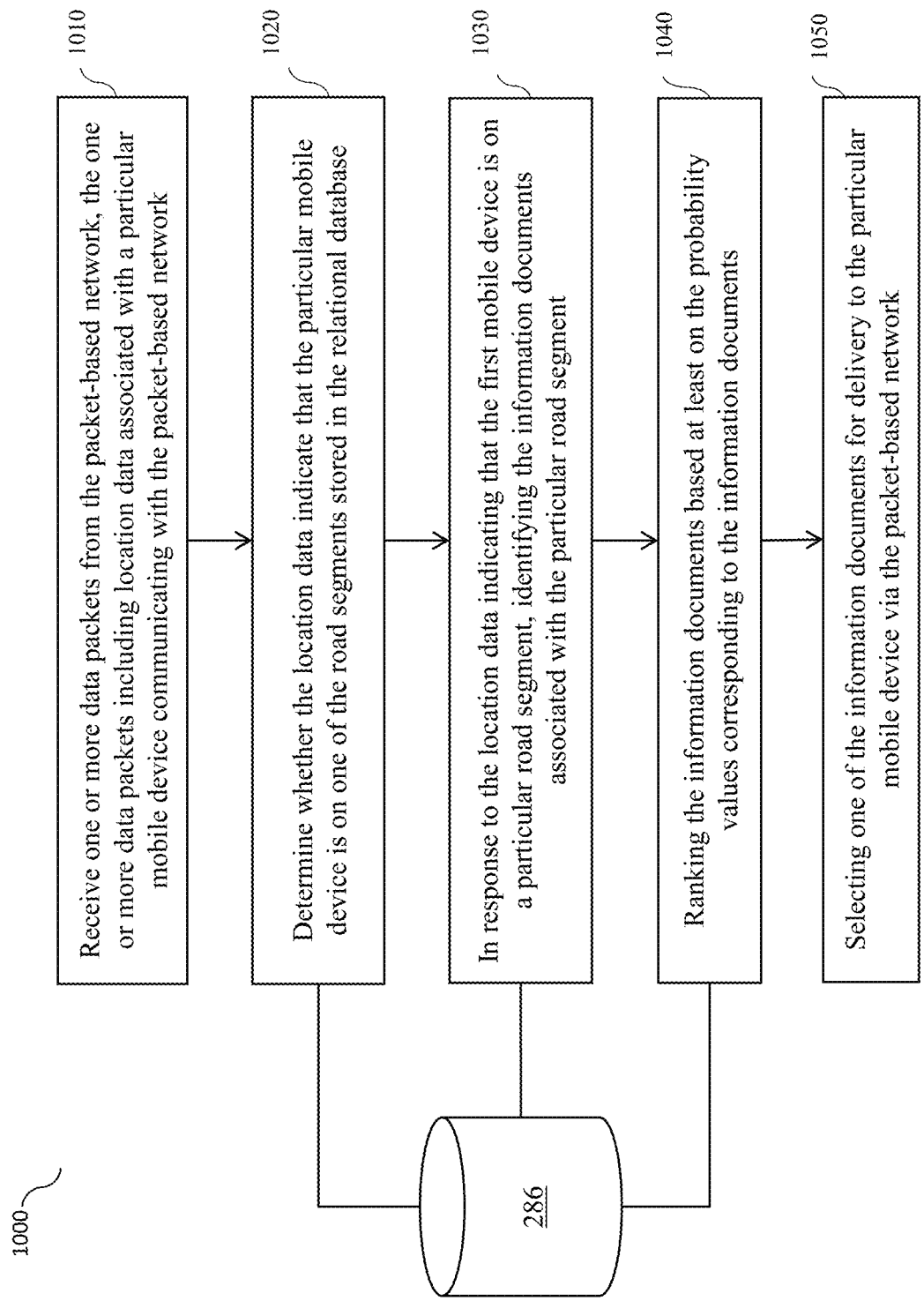
FIG. 10 is a flow diagram illustrating a process performed by a computer system coupled to the network to serve location-based information to mobile devices on public roads, according to certain embodiments.

FIG. 10 is a flow diagram illustrating a process 1000 of the request processor 272 to serve location-based information to mobile devices on public roads, according to certain embodiments. As shown in FIG. 10, the process 1000 includes blocks 1010, 1020, 1030, 1040, and 1050. At block 1010, one or more data packets including an information request are received via the packet-based network from a publisher interacting with a particular mobile device. The information request includes location data and other information about the particular mobile device.

At block 1020, the spatial indices defining the segments in the relational database 286 are searched to determine whether the location data indicate that the particular mobile device is on one of the road segments. In response to the location data indicating that the particular mobile device is on a particular road segment, at block 1030, one or more information documents associated with the particular road segment are identified. In certain embodiments, the information documents are related to respective ones of the billboards associated with the particular road segments and/or respective POIs accessible via the particular road segments. The information documents may also include meta data about the corresponding billboards, such as sizes, locations, and facing directions, etc. of the billboards. The identified information documents are ranked, at block 1040 based at least on the corresponding probability values in the relational database 286. Other factors, such as the meta data about the corresponding billboards, the information displayed, information about the user of the particular mobile device (e.g., age, gender, education level, and related historical/statistical data, etc.), time of day, campaign budgets, etc. At block 1050, one of the one or more information documents is selected based on the ranking, and one or more data packets including the selected information document or a link thereto are formed and transmitted via the packet-based network. The one or more data packets may also include identification of the information request and/or the particular mobile device to facilitate delivery of the selected information document to the particular mobile devices.

Several embodiments of the disclosed technology are described above in reference to the figures. Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

We claim:
1. A method performed by one or more processors of one or more computer systems coupled to a packet-based network, the one or more processors having access to one or more data stores storing therein map data about public roads in a geographical region, the method comprising:
accessing location data corresponding to location signals associated with a plurality of mobile devices communicating with the packet-based network via software applications on the mobile devices, each location signal indicating a location of a certain mobile device in the geographical region at a certain time;
deriving a plurality of commute routes in the geographical region associated with the plurality of mobile devices based at least on densities of location signals associated with respective mobile devices mapped into the geographical region using the location data and the map data, wherein each of the plurality of commute routes includes a sequence of road segments, the sequence of road segments including at least two neighboring road segments separated from each other by one or more of: an entrance ramp by which to enter one of the at least two road segments, an exit ramp by which to exit one of the at least two road segments, an intersection, and a highway junction, each of the sequence of road segments corresponding to a segment of a public road in the geographical region;
determining associations between a plurality of road segments and a plurality of physical structures in the geographical region, including, for each physical structure of the plurality of physical structures and for each respective road segment of a set of road segments proximate to the physical structure, determining a probability value associating the respective road segment with the physical structure using some of the plurality of commute routes, the probability value indicating a degree of likelihood of a traveler on the respective road segment being exposed to information displayed on the physical structure;
building a relational database of associations between a plurality of road segments and a plurality of information documents based on the associations between the plurality of road segments and the plurality physical structures, each of the plurality of information documents corresponding to one or more of the plurality of physical structures in the geographical region and including information displayed by the one or more of the plurality of physical structures, wherein a road segment is indicated in the relational database as being associated with one or more information documents by one or more corresponding probability values;
receiving a request for information from the packet-based network, the request for information including data indicating a location of a particular mobile device communicating with the packet-based network;
in response to the location being on a road segment associaed with at least one information document by at least one probability value in the relational database, selecting an information document from among the at least one information document based at least in part on the at least one probability value; and transmitting one or more data packets identifying the particular mobile device and including the selected information document or a link thereto to the packet-based network.

2. The method of claim 1, wherein deriving the plurality of commute routes comprises, for each respective mobile device of the plurality of mobile devices, determining at least a first place and a second place based at least on densities of location signals associated with the respective mobile device mapped into the geographical region, and determining at least one set of commute routes between the first place and the second place using the map data, each of the first place and the second place being a place where the respective mobile device is regularly located as indicated by the location signals associated with the respective mobile device.

3. The method of claim 1, wherein the set of road segments include a first road segment and a second road segment, the first road segment being home to the physical structure, the second road segment being associated with the physical structure by a probability value corresponding to an estimated percentage of traffic on the second road segment proceeding to or coming from the first road segments.

4. The method of claim 1, wherein the set of road segments include a first road segment and one or more second road segments, the first road segment being home to the physical structure, the one or more second road segments including a third road segment via which a traveler can enter the first road segment, wherein determining a probability value associating the third road segment with the physical structure includes determining a probability value indicating a degree of likelihood of a traveler on the third road segment proceeding to the first road segment based at least on a number of commute routes including the third road segments and a percentage of the number of commute routes continuing onto the first road segment.

5. The method of claim 4, wherein the one or more second road segments include a fourth road segment to which a traveler on the first road segment can proceed, wherein determining a probability value associating the fourth road segment with the physical structure includes, determining a probability value indicating a degree of likelihood of a traveler on the fourth road segment coming from the first road segment based at least on a number of commute routes including the fourth road segments and a percentage of the number of commute routes coming from the first road segment.

6. A method performed by one or more processors of one or more computer systems coupled to a packet-based network, the method comprising:
accessing location data corresponding to location signals associated with a plurality of mobile devices communicating with the packet-based network via software applications on the mobile devices, each location signal indicating a location of a certain mobile device in the geographical region at a certain time;
deriving a plurality of commute routes associated with the plurality of mobile devices based at least on densities of location signals associated with respective mobile devices mapped into a geographical region using the location data and map data, wherein each of the plurality of commute routes includes a sequence of road segments, the sequence of road segments including at least two neighboring road segments separated from each other by one or more of: an entrance ramp by which to enter one of the at least two road segments, an exit ramp by which to exit one of the at least two road segments, an intersection, and a highway junction, each of the sequence of road segments corresponding to a segment of a public road in the geographical region;
determining associations between a plurality of road segments and a plurality of physical structures in the geographical region, including, for each respective physical structure of the plurality of physical structures, and for each respective road segment of a respective set of road segments proximate to the respective physical structure, determining a respective probability value associating the respective road segment with the respective physical structure using some of the plurality of commute routes, the respective probability value indicating a degree of likelihood of a traveler on the respective road segment being exposed to information displayed on the respective physical structure;
building a relational database of associations between a plurality of road segments and a plurality of information documents based on the associations between the plurality of road segments and the plurality physical structures, each of the plurality of information documents corresponding to one or more of the plurality of physical structures in the geographical region and including information displayed by the one or more of the plurality of physical structures, wherein a road segment is indicated in the relational database as being associated with at least one information document by at least one corresponding probability value;
receiving a request for information from the packet-based network, the request for information including location data indicating a location of an associated mobile device communicating with the packet-based network;
in response to the location data indicating that the associated mobile device is on a road segment associated with one or more information documents by one or more corresponding probability values higher than a preset threshold, selecting an information document for delivery to the associated mobile device from the one or more information documents based at least in part on the one or more corresponding probability values; and
transmitting the selected information document or a link thereto with identification of the associated mobile device to the packet-based network.

7. The method of claim 6, wherein the respective road segment is home to the respective physical structure; and wherein the respective probability value is 100%.

8. The method of claim 6, wherein:
the respective road segment is proximate to a particular road segment that is home to the respective physical structure;
the respective road segment is separated from the particular road segment by at least one of: an entrance ramp by which to enter the respective road segment, an exit ramp by which to exit the particular road segment, an intersection, a highway junction, and one or more other road segments; and
the respective probability value corresponds to a probability that a traveler on the respective road segment may have come from the particular road segment and is determined based at least on a number of commute routes including the respective road segments and a percentage of the number of commute routes coming from the particular road segment.

9. The method of claim 6, wherein:
the respective road segment is proximate to a particular road segment that is home to the respective physical structure;

the respective road segment is separated from the particular road segment by at least one of: an entrance ramp by which to enter the particular road segment, an exit ramp by which to exit the respective road segment, an intersection, a highway junction, and one or more other road segments; and the respective probability value corresponds to a probability that a traveler on the respective road segment may be proceeding to the particular road segment and is determined based at least on a number of commute routes including the respective road segments and a percentage of the number of commute routes continuing onto the particular road segment.

10. The method of claim 6, wherein determining a respective probability value associating the respective road segment with the respective physical structure using at least some of the commute routes comprises:

determining a first plurality of commute routes associated with a plurality of mobile devices using location data derived from mobile signals transmitted by the plurality of mobile devices, each of the plurality of commute routes including the respective road segment;

determining a second plurality of commute routes among the first plurality of commute routes, each of the second plurality of commute routes including a particular road segment that is home to the respective physical structure; and determining the respective probability value using a number of commute routes in the first plurality of commute routes and a number of commute routes in the second plurality of commute routes.

11. The method of claim 6, wherein the respective set of road segments include a first road segment and one or more second road segments proximate to the first road segment, and the method further comprises associating each of the first road segment and the one or more second road segments with one or more information documents corresponding to the respective physical structure, wherein the first road segment is home to the respective physical structure, and wherein a probability that a traveler on any of the one or more second road segment may have come from or may be proceeding to the first road segment is higher than a preset threshold.

12. A non-transitory computer readable medium storing therein computer readable instructions which, when executed by one or more processors coupled to a packet-based network and having access to one or more data stores, cause the one or more processors to perform a method comprising:

accessing location data corresponding to location signals associated with a plurality of mobile devices communicating with the packet-based network via software applications on the mobile devices, each location signal indicating a location of a certain mobile device in the geographical region at a certain time;

deriving a plurality of commute routes associated with the plurality of mobile devices based at least on densities of location signals associated with respective mobile devices mapped into the geographical region using the location data and map data, wherein each of the plurality of commute routes includes a sequence of road segments, the sequence of road segments including at least two neighboring road segments separated from each other by one or more of: an entrance ramp by which to enter one of the at least two road segments, an exit ramp by which to exit one of the at least two road segments, an intersection, and a highway junction, each of the sequence of road segments corresponding to a segment of a public road in the geographical region;

determining associations between a plurality of road segments and a plurality of physical structures in the geographical region, including, for each respective physical structure of the plurality of physical structures, and for each respective road segment of a respective set of road segments proximate to the respective physical structure, determining a respective probability value associating the respective road segment with the respective physical structure using some of the plurality of commute routes, the respective probability value indicating a degree of likelihood of a traveler on the respective road segment being exposed to information displayed on the respective physical structure;

building a relational database of associations between a plurality of road segments and a plurality of information documents based on the associations between the plurality of road segments and the plurality physical structures, each of the plurality of information documents corresponding to one or more of the plurality of physical structures in the geographical region and including information displayed by the one or more of the plurality of physical structures, wherein a road segment is indicated in the relational database as being associated with at least one information document by at least one corresponding probability value;

receiving a request for information from the packet-based network, the request for information including location data indicating a location of an associated mobile device communicating with the packet-based network;

in response to the location data indicating that the associated mobile device is on a road segment associated with one or more information documents by one or more corresponding probability values higher than a preset threshold, selecting an information document for delivery to the associated mobile device from the one or more information documents based at least in part on the one or more corresponding probability values; and transmitting the selected information document or a link thereto with identification of the associated mobile device to the packet-based network.

13. The non-transitory computer readable medium of claim 12, wherein the respective road segment is home to the respective physical structure; and wherein the respective probability value is 100%.

14. The non-transitory computer readable medium of claim 12, wherein:

the respective road segment is proximate to a particular road segment that is home to the respective physical structure;

the respective road segment is separated from the particular road segment by at least one of: an entrance ramp by which to enter the respective road segment, an exit ramp by which to exit the particular road segment, an intersection, a highway junction, and one or more other road segments; and the respective probability value corresponds to a probability that a traveler on the respective road segment may have come from the particular road segment and is determined based at least on a number of commute routes including the respective road segments and a percentage of the number of commute routes coming from the particular road segment.

15. The non-transitory computer readable medium of claim 12, wherein:
- the respective road segment is proximate to a particular road segment that is home to the respective physical structure;
- the respective road segment is separated from the particular road segment by at least one of: an entrance ramp by which to enter the particular road segment, an exit ramp by which to exit the respective road segment, an intersection, a highway junction, and one or more other road segments; and
- the respective probability value corresponds to a probability that a traveler on the respective road segment may be proceeding to the particular road segment and is determined based at least on a number of commute routes including the respective road segments and a percentage of the number of commute routes continuing onto the particular road segment.

16. The non-transitory computer readable medium of claim 12, wherein determining a respective probability value associating the respective road segment with the respective physical structure using at least some of the commute routes comprises:
- determining a first plurality of commute routes associated with a plurality of mobile devices using location data derived from mobile signals from the plurality of mobile devices, each of the plurality of commute routes including the respective road segment;
- determining a second plurality of commute routes among the first plurality of commute routes, each of the second plurality of commute routes including particular road segment that is home to the respective physical structure; and
- determining the respective probability value based on a number of commute routes in the first plurality of commute routes and a number of commute routes in the second plurality of commute routes.

17. The non-transitory computer readable medium of claim 12, wherein the respective set of road segments include a first road segment and one or more second road segments proximate to the first road segment, and wherein the method further comprises: associating each of the first road segment and the one or more second road segments with one or more information documents corresponding to the respective physical structure, wherein the first road segment is home to the each billboard, and wherein a probability that a traveler on any of the one or more second road segment may have come from or may be proceeding to the first road segment is higher than a preset threshold.

* * * * *